US011244350B1

(12) United States Patent
Soliman

(10) Patent No.: US 11,244,350 B1
(45) Date of Patent: Feb. 8, 2022

(54) DIGITAL SPACE ESTATE MANAGEMENT AND INTELLIGENT CONTENT DISTRIBUTION

(71) Applicant: Michael Soliman, Aliso Viejo, CA (US)

(72) Inventor: Michael Soliman, Aliso Viejo, CA (US)

(*) Notice: Subject to any disclaimer, the term of this patent is extended or adjusted under 35 U.S.C. 154(b) by 781 days.

(21) Appl. No.: 15/802,454

(22) Filed: Nov. 3, 2017

Related U.S. Application Data

(60) Provisional application No. 62/416,877, filed on Nov. 3, 2016.

(51) Int. Cl.
G06Q 30/02 (2012.01)
G06F 21/44 (2013.01)

(52) U.S. Cl.
CPC ..... *G06Q 30/0251* (2013.01); *G06Q 30/0246* (2013.01); *G06Q 30/0272* (2013.01); *G06F 21/44* (2013.01)

(58) Field of Classification Search
CPC .......... G06Q 30/0251; G06Q 30/0272; G06Q 30/0246; G06F 21/44
See application file for complete search history.

(56) References Cited

U.S. PATENT DOCUMENTS 7,921,036 B1 * 4/2011 Sharma .................. G06Q 30/02
705/14.66
8,775,252 B2 * 7/2014 Wu ..................... G06Q 30/0245
705/14.43

(Continued)

OTHER PUBLICATIONS

Haritaoglu and M. Flickner, "Attentive billboards," Proceedings 11th International Conference on Image Analysis and Processing, 2001, pp. 162-167, doi: 10.1109/ICIAP.2001.957002. (Year: 2001).*

*Primary Examiner* — Abhishek Vyas
*Assistant Examiner* — Monica A Mandel

(57) ABSTRACT

A system and method for digital space estate management and content distribution is described. This system and method is comprised of an allotted number of time slots of fixed or variable duration, which are analyzed as digital space estates and devoted to content distribution. This system is configured to provide a web service portal which allows users to view available digital space estates, and either purchase them for a fixed price or variable price by proposing a higher acquisition offer amount than potential other users who have submitted offers on the same digital space estate. The system is further configured to utilize attributes of time slots and digital display nodes to recommend time slots to users. The system is configured to allow users to resell acquired digital space estates to other users. This system and method may further include a means of generating desirability index scores based on historical patterns of digital space estate purchases and feedback from location based analytics software systems employed on the various digital display nodes. This system and method may further be comprised of a smart node tracking system that uses data, in the form of feedback data such as video recordings and location based analytics software to make decisions on both the initial delivery of digital content and the readjustment of digital content for delivery to the advancing digital display node(s) along digitally projected future paths of the respective viewers in one of any number of geographic locations.

10 Claims, 31 Drawing Sheets

(56) References Cited

U.S. PATENT DOCUMENTS

2011/0208580 A1\* 8/2011 Wolinsky ........... G06Q 30/0249
705/14.48
2015/0154633 A1\* 6/2015 Crow ................. G06Q 30/0251
705/14.49

\* cited by examiner

| Offer Range | Auto Increment |
|---|---|
| $a \leq z \leq b$ | x |
| $c \leq z \leq d$ | 2x |
| $e \leq z \leq f$ | 4x |
| $g \leq z \leq h$ | 8x |
| $i \leq z \leq j$ | 16x |
| $k \leq z \leq l$ | 32x |
| $m \leq z \leq n$ | 64x |
| $o \leq z \leq p$ | 128x |
| $q \leq z \leq r$ | 256x |
| $s \leq z \leq t$ | 512x |
| $u \leq z \leq v$ | 1024x |
| $z > w$ | 2048x |

1006 — x: incremental step

1008 — z: current offer

| Offer Range | Fixed Increment |
|---|---|
| $a \leq z \leq b$ | x |
| $c \leq z \leq d$ | x |
| $e \leq z \leq f$ | x |
| $g \leq z \leq h$ | x |
| $i \leq z \leq j$ | x |
| $k \leq z \leq l$ | x |
| $m \leq z \leq n$ | x |
| $o \leq z \leq p$ | x |
| $q \leq z \leq r$ | x |
| $s \leq z \leq t$ | x |
| $u \leq z \leq v$ | x |
| $z > w$ | x |

To: user_1@email.com

From: staff@company.com

Subject: Acquisition offer update needed for display node no. 2122 on September 24, 2017 at 7:07:00 PM Dear User 1, You no longer have the highest acquisition offer amount in place for your digital space estate here.

If you are still determined to acquire this specific time slot, you will need to offer a higher acquisition fee amount with an offer fee of at least $7.00. If you would like us to automatically upgrade your offer amount with this amount, please click here.

However, if you are no longer interested in this time slot but are still interested in other digital space estates available, we have alternative options compiled based on various characteristics that our algorithms determined to have in common with your original time slot choice. Please click here to view these options.

FIG. 27

DIGITAL SPACE ESTATE MANAGEMENT AND INTELLIGENT CONTENT DISTRIBUTION

CROSS-REFERENCE TO RELATED APPLICATION

The present application is a U.S. nonprovisional patent application of, and claims priority under 35 U.S.C. § 119(e) to, U.S. provisional patent application Ser. No. 62/416,877, filed Nov. 3, 2016, which provisional patent application is incorporated by reference herein. A copy of this provisional is attached hereto as Appendix A, which appendix is hereby incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention is directed to registering and authenticating digital display nodes in various locations as well as managing the delivery of digital content provided by digital content providers who are users of the digital space estate management system. More particularly, the present invention is in the technical field of a software system where digital content of a certain content provider is distributed based on their purchase of a digital space estate from a variety of digital space estates on any number of digital display nodes. Digital signage is a growing field of interest. As the digital signage market continues to develop and the move is made away from traditional paper advertisement content through the deployment of magazines, newspapers, and billboards there becomes an increasing need for a more efficient and intelligent digital content delivery system. The growth of digital billboards and displays can be seen at business locations, locations of interest along roads, highways, and freeways. There is value in transmitting relevant digital content to digital signage displays. Additionally, digital displays, in contrast to more traditional printed content, can provide not just static images, but audio and video based content. While there are plenty of advantages for advertisement content providers to go digital, there are also financial and deployment obstacles that lay before many clients that do not have access to the deep financial pockets of the big corporations. There is a need for a system and method to allow any number of individuals from any financial background to intelligently and cost effectively target their desired audience via a platform that enables the delivery of their digital content. There is also a need for a system and method to allow any individual(s) from any background to intelligently and cost effectively target their desired audience via a platform that can utilize digital signage intelligence to target audience based on digitally perceived prior interest or lack thereof of digital space estate content. One ore more needs exist for improvement in digital content provision. One or more aspects of the present invention address these needs, and other needs.

SUMMARY OF THE INVENTION

The present invention includes many aspects and features. Moreover, while many aspects and features relate to, and are described in, the context of digital advertising, the present invention is not limited to use only in this context, as will become apparent from the following summaries and detailed descriptions of aspects, features, and one or more embodiments of the present invention.

As such, one aspect of the present invention relates to digital content and another to systems and methods for intelligent digital content distribution. The present invention relates to allocation of digital space estates that come in a variety of sizes in regards to the time domain. A digital space estate is defined as an open time slot on which digital content can be published for an audience to view on a digital display node(s) in any number of geographic locations. In an embodiment of the present invention, digital content is provided for display on a digital display node in one or more geographic locations. The method comprises of dividing a day into a fixed or dynamic number of time slots known as digital space estates on each individual digital display node. The size of each digital space estate may vary based on geographic location and operating hours of said location. Content distributors may acquire these digital space estates through monetary transaction(s) conducted over a web application, which receives and transmits data via current communication standards. One aspect of the present invention relates to a method that includes displaying to a variety of users via a display device associated with a first electronic device, an interface for a web service portal configured to allow a user to select time slots for one or more of a plurality of digital display nodes for presentation of digital content of the user and receiving, from anyone of a plurality of users via the presented interface, user input corresponding to identification of one or more user preferences for locating available digital space estate(s) with the greatest relevance score. The method further includes automatically determining, at a remote management server, whether an acquisition offer was made on a digital space estate is defined as a fixed price or variable price digital space estate, determining that a user submitted an acquisition offer on a fixed price digital space estate, facilitating an online sales transaction, after which the time slot associated with that digital space estate is assigned to said user, scheduling the digital content of that subsequent winning user to be displayed on the first digital display node during the first time slot and effecting display, at a time corresponding to the first time slot, of said user's digital content on the first digital display node based on the acquisition offer amount for the fixed price digital space estate. If the digital space estate was for a variable price digital space estate then the system automatically determines that and receives from the first user, user input corresponding to a first acquisition offer to purchase the time slot associated with the first selected digital space estate of the one or more digital space estates for a first purchase amount. The method still further includes storing, in a data store, data corresponding to first acquisition offer to purchase the time slot associated with the selected estate for first purchase amount, the time slot being a first time slot for a first digital display node, receiving from a second user or subsequent plurality of other users, user input corresponding to a second acquisition offer to purchase the time slot associated with selected digital space estate, the time slot being the first time slot for the first digital display node. The system then determines if the second or plurality of other acquisition offers exceeds the first acquisition offer for the first time slot for the first digital display node, storing, in a data store, data corresponding to the second or plurality of subsequent acquisition offers to purchase the time slot associated with the selected digital space estate for another acquisition offer amount, the time slot being the first time slot for the first digital display node. The method still further includes automatically effecting communication to the first user of a message informing the first user that an acquisition offer with a higher acquisition offer amount has been received further comprises informing the first user of an acquisition offer amount that would be sufficient to have the highest proposed acquisition offer. Upon expiration of an acquisition offer period for the first time slot for the first digital display node determining that the first user did not resubmit an updated higher acquisition offer amount, further determining that the second or subsequent acquisition offer amount from the second or one of the plurality of other users was the highest received acquisition offer amount and scheduling the digital content of that subsequent winning user to be displayed on the first digital display node during the first time slot. The method still further includes effecting display, at a time corresponding to the first time slot, of second or subsequent user's digital content on the first digital display node based on the second or subsequent acquisition offer.

In a feature of this aspect, automatically comparing, at a remote management server, attributes of a third plurality of digital space estates to attributes associated with the first time slot for the first digital display node, and auto determining, based on such auto comparisons, a similarity score for each digital space estate.

In a feature of this aspect, automatically effecting communication to the first user of a message informing the first user that an acquisition offer with a higher proposed acquisition offer amount has been received further comprises displaying to a user an indication of one or more digital space estates of the third plurality of digital space estates determined to be similar to the first time slot for the first digital display node based on a similarity score that is stored for each digital space estate.

In a feature of this aspect, the method further comprises receiving, from subsequent user(s) via a presented interface, user input corresponding to an indication to relist their purchased digital space estate on the digital space estate market and receiving from subsequent user(s) via a presented interface, user input corresponding to an indication to either sell their time slot as a whole or to subdivide it and sell one or more of the plurality of their purchased time slot section(s) associated with their digital space estate(s). In a feature of this aspect, wherein the first time slot for the first digital display node comprises a portion of an interlaced time slot with digital space estate type mingling.

In a feature of this aspect, the first digital display node is associated with a camera. In one or more preferred implementations, the method further includes: recording, utilizing the camera, video during display at a time corresponding to the first time slot, of the subsequent user's digital content on the first digital display node based on the subsequent user who had the highest and winning acquisition offer and providing, to the subsequent user, the recorded video.

In one or more preferred implementations, the method further comprises filtering the recorded video to obscure the identity of individuals recorded in the video.

In a feature of this aspect, the first digital display node is disposed in an exterior location. In a feature of this aspect, the first digital display node is disposed in an interior location. In a feature of this aspect, the first digital display node is disposed in a retail location. In a feature of this aspect, the first digital display node is disposed in a transit hub.

In a feature of this aspect, the first digital display node is an LED display.

In a feature of this aspect, the first digital display node is an integrated part of a computing device.

In another embodiment, the method comprises of storing all digital display node locations and detailed information regarding each location in the remote management server(s), such that authorized content distributors can view said information and browse the collection of digital display node(s) in the system through a web application, which receives and transmits data over any communications network standards that are currently employed. In another embodiment and implementation of the present invention, there is a method described that makes use of desirability index scores which are created based on gathered historical and real-time data of digital space estate purchases along with digital display node(s) feedback of location-based analytics regarding current traffic conditions to provide users with a desirability thermal map of the most desirable digital space estate(s). In another implementation of the present invention, a simplified system of removing digital space estate timeline grid decisions form the users of the web service portal interface is described. This method would provide a means for at least one or more content distributors who are users of the web service portal interface to simply upload digital content and make minimal decisions thereby allowing the digital space estate management system to intelligently handle various transactions related to deployment of digital content to digital display nodes. In another embodiment, there is a system incorporated into the digital display node(s) for the processing and analysis of location-based information such as perceived human interest in the content displayed on the digital display node or digital display node traffic conditions during specific or all times of day, through the use of an analytics calculation system. Another embodiment is the analysis of location-based information on each digital display node for every digital space estate of interest. The information processed by the analytics software is stored on one or more remote management server(s). All users of the web service portal and authorized content distributors will be able to view this information through a web service portal, which receives and transmits data over any communications network standards that are currently employed. In yet another embodiment of the present invention of digital space estate content distribution system aforementioned above, there is a system and method which uses intelligent location-based analytics feedback for more appropriate placement and migration of digital content on purchased digital space estates that exist on a network of digital display nodes. This method allows for the placement of the same, similar or different digital content along digitally projected future paths of individuals based on the perceived level of interest recorded and analyzed for prior time slots.

BRIEF DESCRIPTION OF THE DRAWINGS

A clear understanding of the key features of the invention summarized above may be had by reference to the accompanying drawings, which illustrate the method and system of the invention, although it will be understood that such drawings depict preferred embodiments of the invention and, therefore, are not to be considered as limiting its scope with regard to other embodiments which the invention is capable of contemplating. One or more preferred embodiments of the present invention now will be described in detail with reference to the accompanying drawings which may not necessarily be drawn to scale, wherein the same elements are referred to with the same reference numerals, and wherein:

FIG. 10 illustrates how the system of incremental digital space estate acquisition offers works;

FIG. 27 illustrates an exemplary communication with a user of the digital space estate management system including a recommendation;

Figure 1:
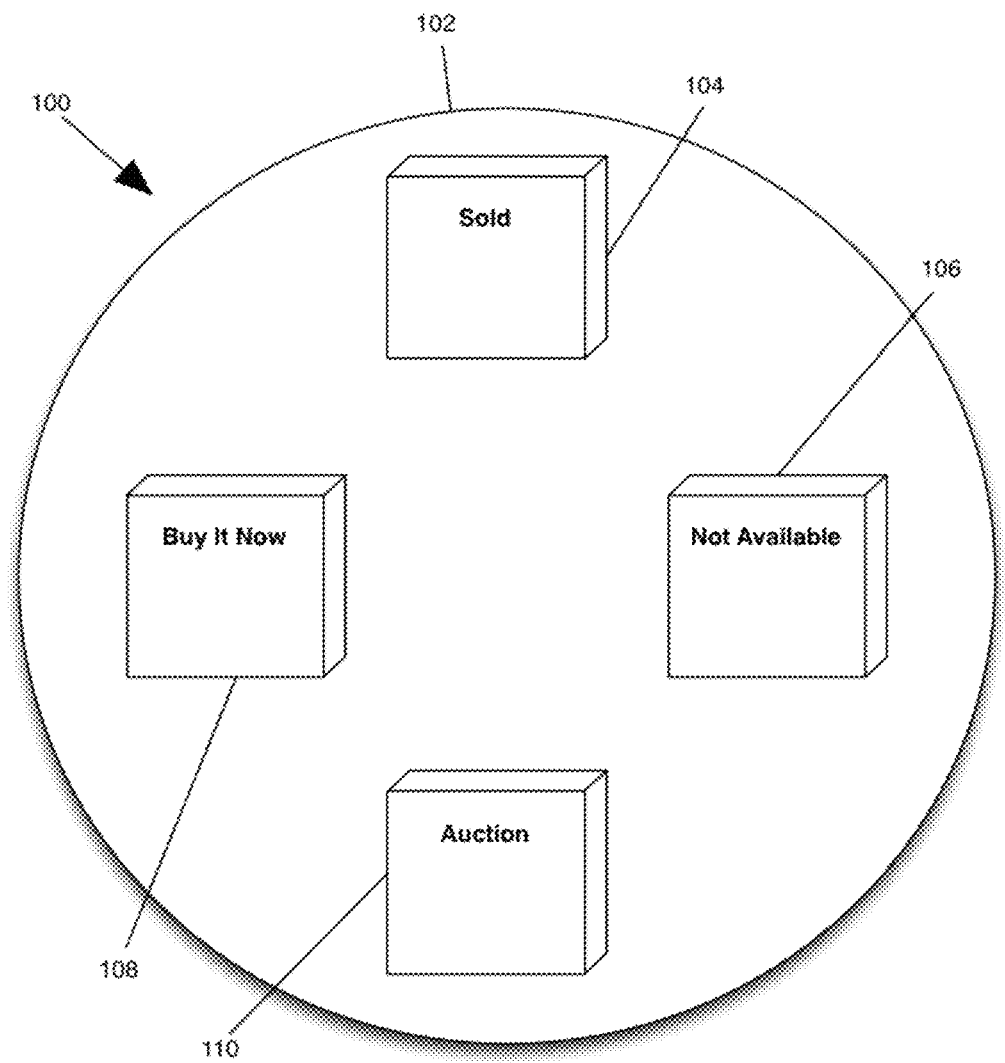
FIG. 1 is a perspective view of all the digital space estates and their respective names within a collective digital space estate set of the present invention.

The figures depict embodiments of the present invention for purposes of illustration only. One will readily recognize from the following description that alternative embodiments of the structures and methods illustrated herein may be employed without departing from the principles of the invention described herein. DETAILED DESCRIPTION AND BEST MODE OF IMPLEMENTATION As a preliminary matter, one having ordinary skill should be able to easily comprehend the relevant art ("Ordinary Artisan") that the present invention has broad utility and application. As should be readily understood, any embodiment may incorporate only one or a plurality of the aforementioned disclosed aspects of the invention and may further incorporate only one or a plurality of the aforementioned disclosed features. Furthermore, any embodiment discussed and identified as being "preferred" is considered to be part of a best mode that is contemplated for carrying out the present invention. Several other embodiments and implementations may be discussed in order to provide a number of illustrative purposes to serve the goal of passing along a full and enabling disclosure of the present invention. As should be understood, any embodiment may incorporate only one or a plurality of the aforementioned disclosed aspects of the invention and may further incorporate only one or a plurality of the aforementioned disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of on or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a bag having an orange" describes "a bag having at least one orange" as well as "a bag having oranges." In contrast, reference to "a bag having a single orange" describes "a bag having only one orange."

When used herein to join a list of items, "or" denotes "at least one of the items," but does not exclude a plurality of items of the list. Thus, reference to "a bag having jelly or peanuts" describes "a bag having jelly without peanuts", "a bag having peanuts without jelly", and "a bag having both jelly and peanuts." Finally, when used herein to join a list of items, "and" denotes "all of the items of the list." Thus, reference to "a bag having jelly and peanuts" describes "a bag having jelly, wherein the bag further has peanuts," as well as describes "a bag having peanuts, wherein the bag further has jelly."

Referring now to the drawings, one or more preferred embodiments of the present invention are next described. The following description of one or more preferred embodiments is merely exemplary in nature and is in no way intended to limit the invention, its implementations, or uses.

Figure 19:
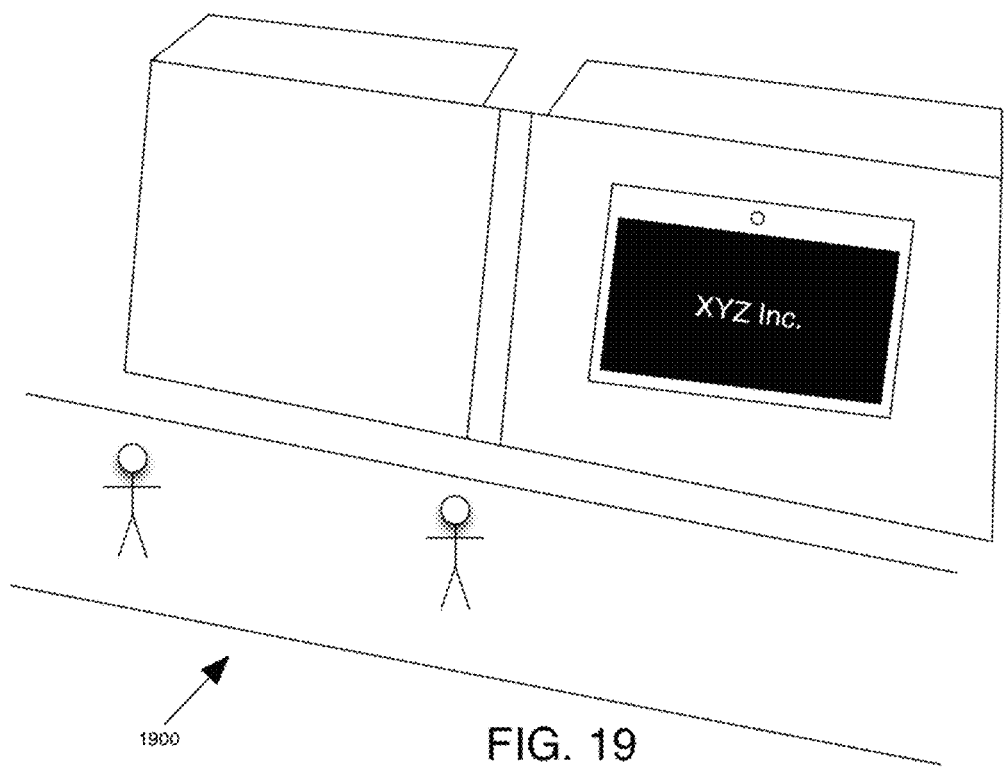
FIGS. 19-21 illustrate an exemplary digital display node set up in a particular corridor and rotation of digital content on the digital display node.
Figure 20:
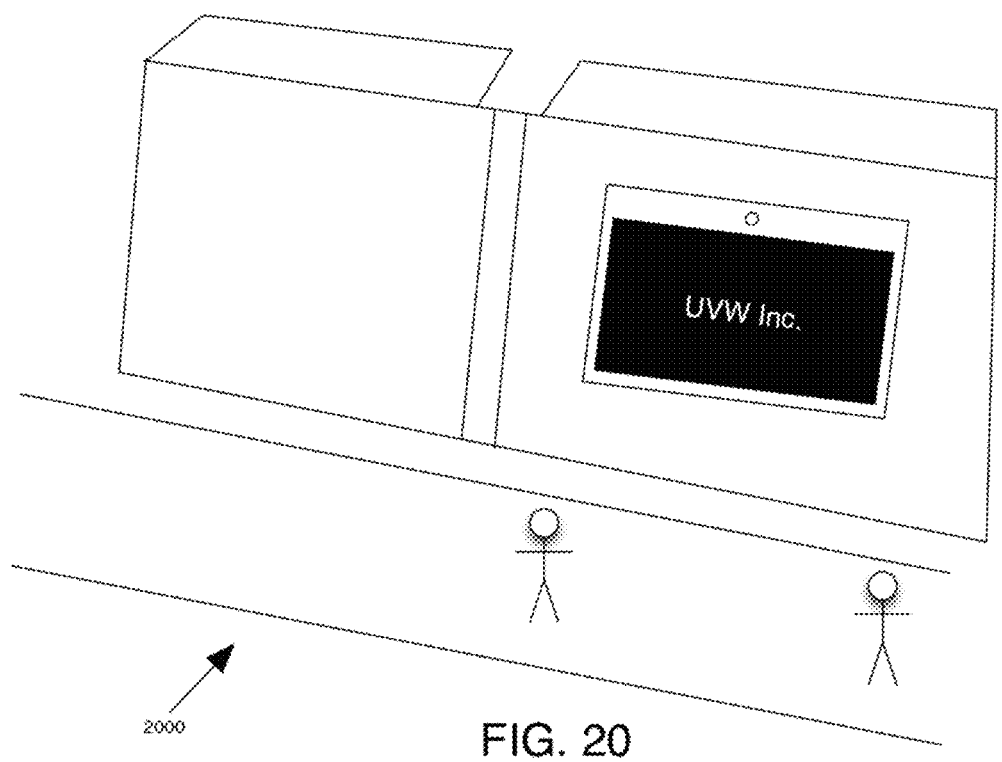
Figure 21:
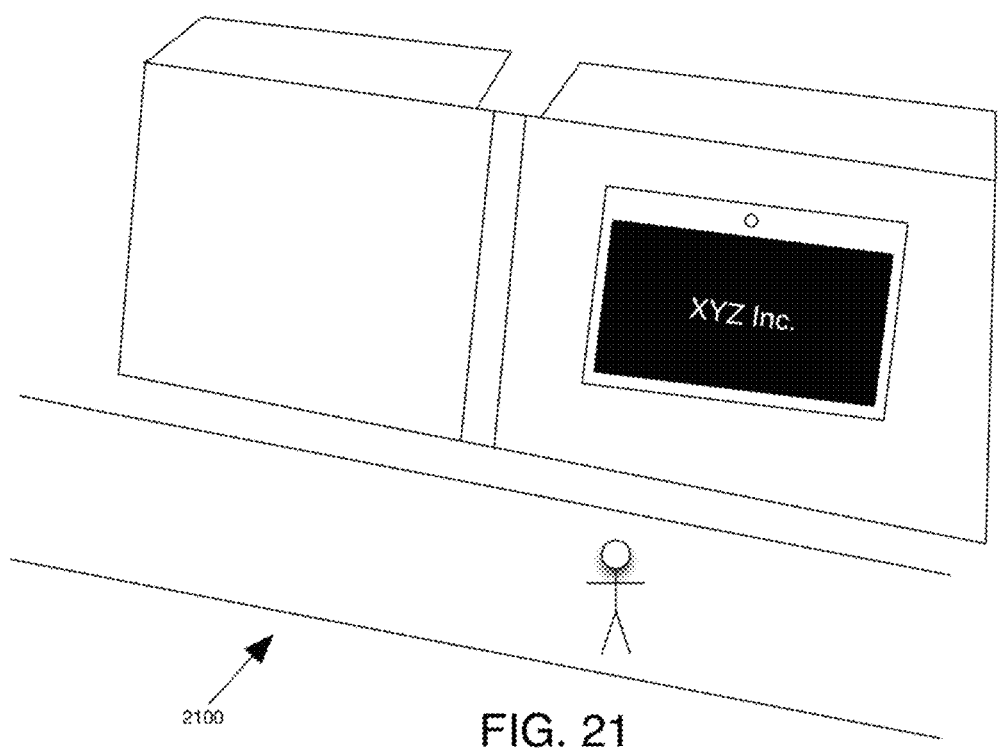

Herein shall be discussed the system of digital space estate management, which will be applied to solving the problem of both unintelligent as well as intelligent digital content distribution. Digital display nodes offer a way to deliver digital content for viewing. FIG. 19 illustrates an exemplary digital display node set up in a subway station corridor, which is delivering content in the form of a digital advertisement from XYZ Inc. Digital display nodes can be programmed for the display of certain digital content at certain times. Typically, however, this involves the display of a very limited amount or fixed set of digital content that may or may not be set on a rotating schedule. For example, FIGS. 19-21 illustrate the rotation of the digital display node of FIG. 19 between the advertisement from XYZ Inc. illustrated in FIG. 19, and a digital advertisement from UVW Inc. illustrated in FIG. 20. In most cases, a content provider has limited or no control over when its content is displayed.

Figure 7:
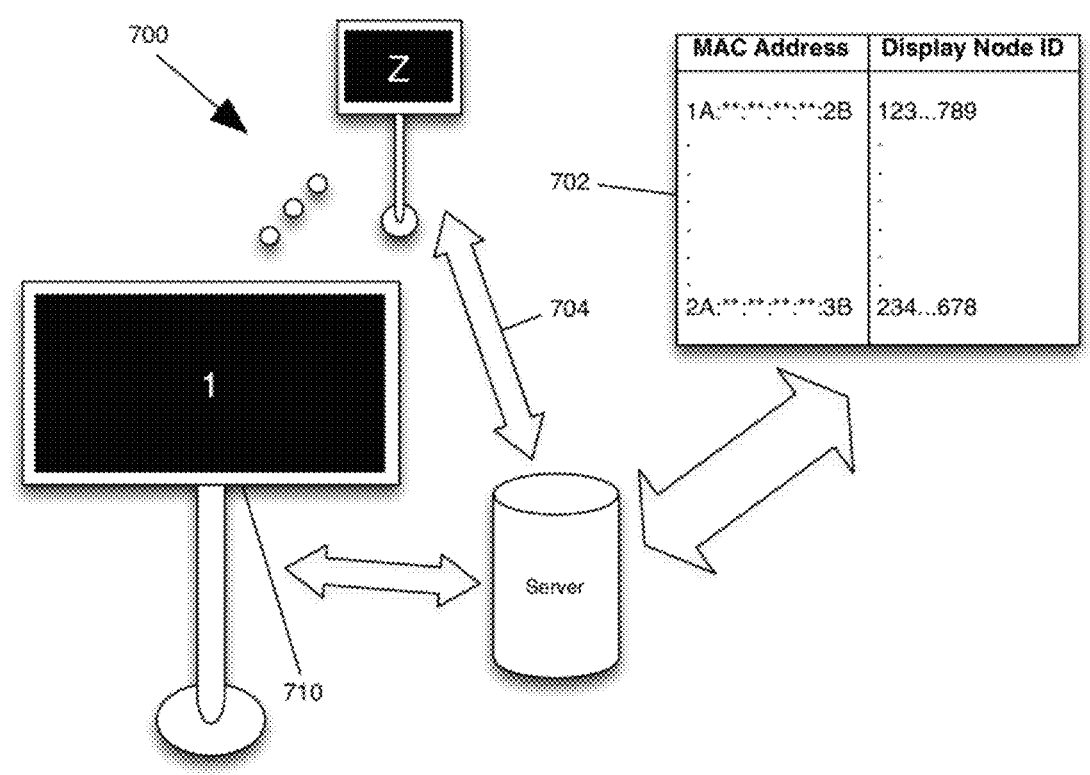
FIG. 7 is a perspective view of the digital display node registration system of the present invention.
Figure 22:
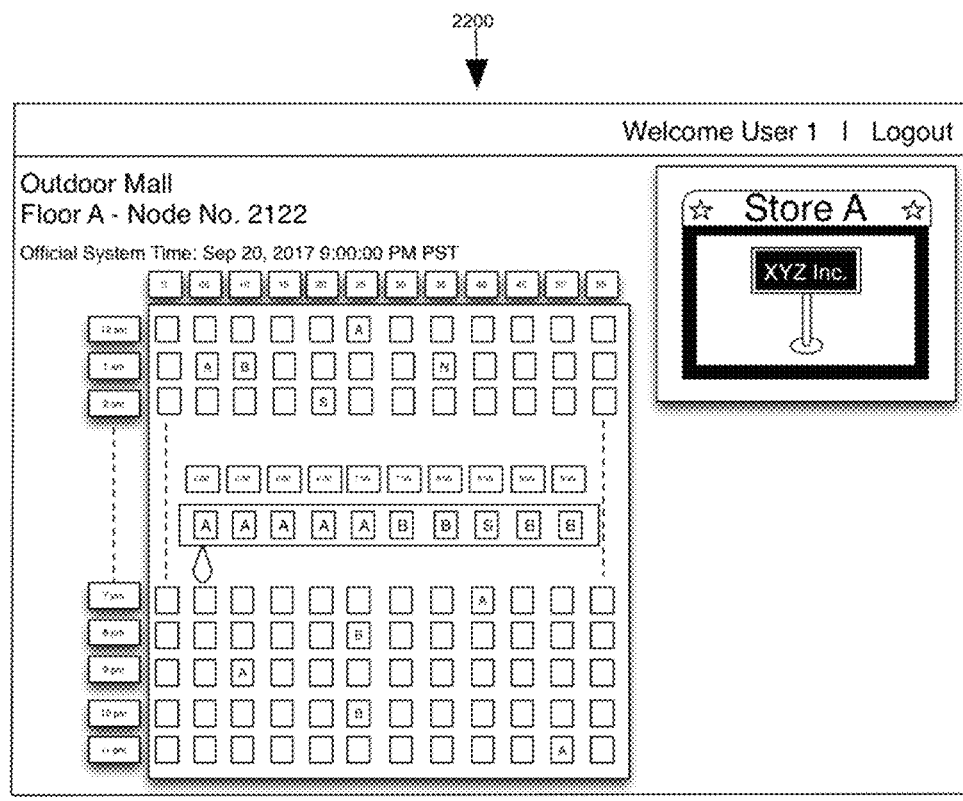
FIG. 22 illustrates an interface of an exemplary web service portal, which is displaying scheduling information for a user for the digital display node located in the store depicted in FIG. 15.

In one or more preferred implementations, however, a system is provided which allows entities to review available time slots for digital display nodes at various geographic locations, and attempt to acquire specific time slots for specific digital display nodes at specific locations of interest. This system employs the concept of a block of time on any one digital display node 710 or a number of digital display nodes as seen in FIG. 7. The sequence of dots that lead to the display labeled "Z" in FIG. 7 are used to indicate a plurality of digital display nodes with no specific ending number as the system is not limited to a certain number of digital display nodes but rather can variably increase or decrease. A digital space estate is defined as a variable block of time on a digital display node 710 that allows for digital content to be published on. A digital display node 710 is defined as an electronic display at any number of geographic locations that is capable of receiving and displaying various types of digital content. Digital content is provided for display on a digital display node 710 in one or more geographic locations. The method comprises of dividing a day into a fixed or dynamic number of digital space estate(s) 316 on each individual digital display node 710. In one or more preferred implementations, a web service portal 1302 provides such functionality. FIG. 22 illustrates an interface of an exemplary web service portal 1302, which is displaying scheduling information for a user for the digital display node of FIG. 19. The interface displays scheduling information for the digital display node 710 in a grid showing partitioned time slots. In this illustrated example, each grid square generally corresponds to either thirty seconds or a minute, although it will be appreciated that other length time slots could be utilized, and various other display schemes could be utilized as well. Preferably, a status of each of these time slots is illustrated via shading or coloring or some other scheme. As mentioned, this time is variable and can be adjusted by the digital space estate management system at any time for any given display. Each digital space estate has an associated cost for potential buyers to purchase a given digital space estate. This cost is also variable and up for adjustment by the digital space estate management system. Content distributors may acquire these digital space estates through a process that involves a monetary transaction conducted over a web service portal 1302, which receives and transmits data via current communication standards.

Figure 3:
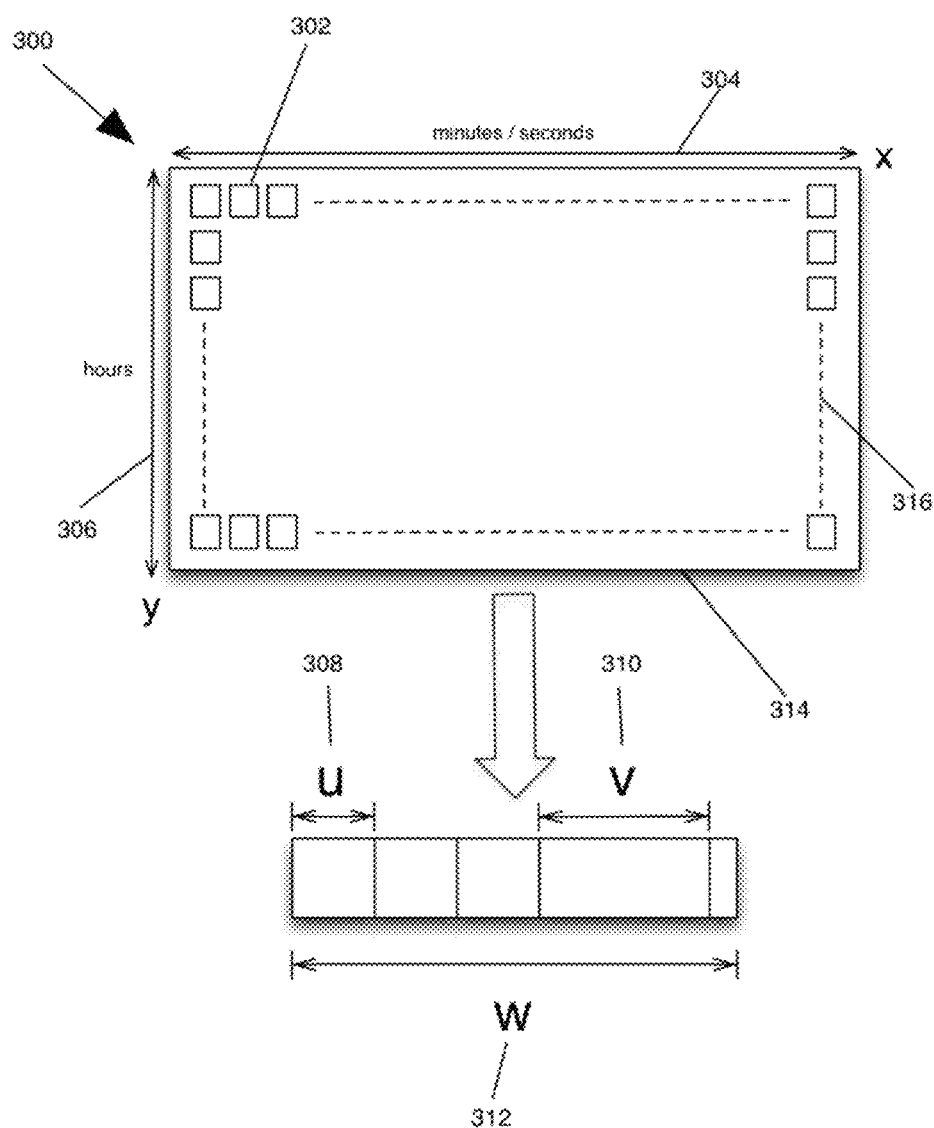
FIG. 3 is a zoomed out and zoomed in view of web service portal perspective of the digital space estate grid of the present invention.
Figure 13:
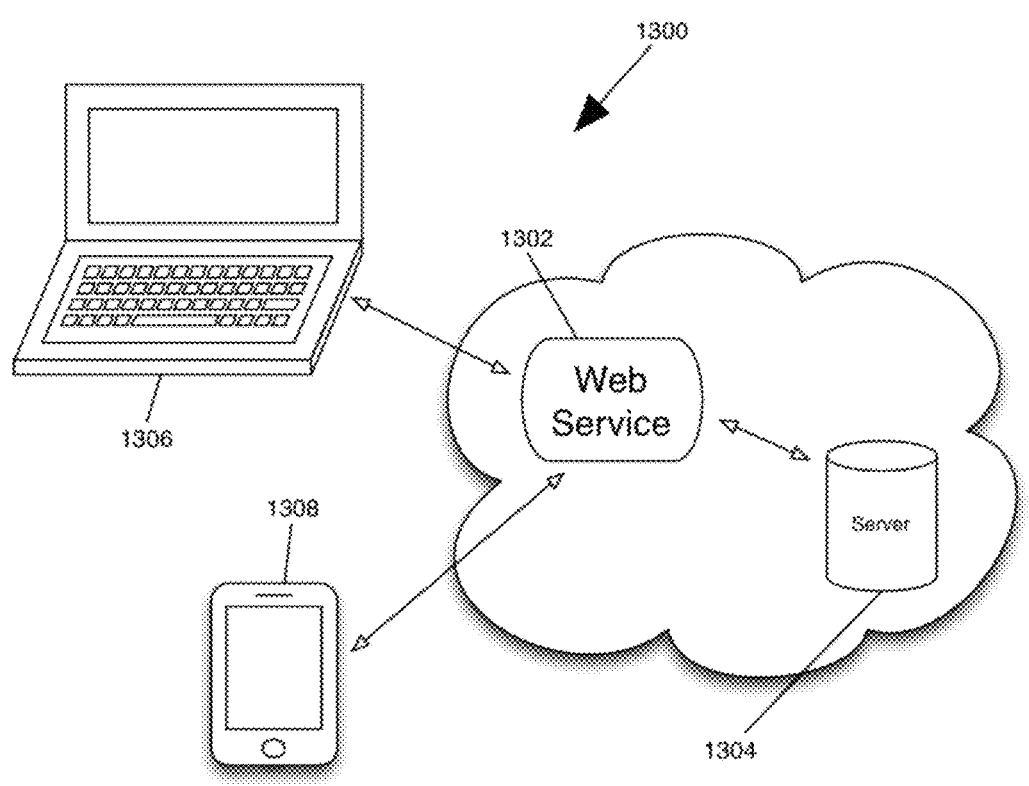
FIG. 13 is a perspective view of digital space estate shopping.

In one or more implementations, a user of the digital space estate management system web service portal 1302 in FIG. 13 is presented with a digital space estate timeline grid 314 as seen in FIG. 3. Time slot for digital space estate(s) 316 are variable and can be set by the digital space estate management company administrator or an automated system. The system is not limited to any single specific implementation of timeline formats. However, to better illustrate the system a few different implementations will be used as examples. As previously mentioned, one implementation can be seen in the form of thirty second intervals of time contained inside five minute boxes within an hour-long row. This could also have been stated as i-second intervals inside j-minute boxes where "i" represents a number of seconds and "j" represents a number of minutes, which can be interpreted in FIG. 3. Another implementation could be represented by hourly row boxes upon which clicked and opened on a web service portal 1302, display four 15-minute rows broken down into 30-second interval digital space estates 316 that in total complete the hour. It can now be understood that the digital space estate timeline grid 314, which contains a smaller component box 302, can represent either the digital space estate specific time interval itself or number of digital space estates 316 within a specified duration of time. Each row represents a different hour of the day that the digital display node(s) 710 may be operational and available for digital content delivery. Columns will always display the x-axis 304 of minutes and seconds while rows will always display the y-axis 306 hours within the given day on the digital display node 710 in question. Thus for any timeline grid, in terms of a coordinate system, one can find hours along the y-axis 306 and minutes as well as seconds along the x-axis 304. All the rows and columns together form a one-day cycle of a digital display node 710. Note that a one-day cycle is not necessarily composed of the standard 24 hours but rather what are deemed "operational" hours of that specific digital display node 710 by the remote management server(s) 1304. For ease of figure reference digital space estate(s) 316 are indicated by the dashed line representing one or all digital space estate(s) 316 on any one of a number of given digital display nodes seen in FIG. 7. In FIG. 3, an example of a zoomed in version of the aforementioned digital space estate timeline grid 314, can also be seen for illustrative purposes. There is no set rule on the number of minutes inside one box but this representation shows one implementation of what 302 could look like if it contains digital space estates 316 within it's particular block of time. Thus for the purposes of this example, it is broken down into smaller intervals of a combination of u-minutes (or seconds) seen referenced by 308 and it's directly adjacent digital space estates 316 as well as v-minute (or seconds) 310 which is of a longer duration size than the u-minute (seconds) where w 312 represents the entire duration of u, v and potentially smaller segments of digital space estate time intervals as seen to the right of 310. Thus, the fraction of time that a digital space estate within a total w 312 duration of time takes can be represented by u/w (u divided by w) or v/w (v divided by w). It is not necessary that the duration of each segment is equivalent as long as the total results in w-minutes (or seconds) 312.

In another embodiment of this invention, the user has the ability to browse the web service portal 1302 via any number of digital communication devices 1306 and 1308 as seen in FIG. 13 and has the freedom to navigate to other hours of the day but if the current hour is the one that the user wants, then colors will indicate the most current digital space estates 316 that a user can either purchase for a fixed price or a variable price based on potential multiple acquisition offers submitted in an auction. Despite specifically listing these two main digital space estate timeline grid 314 scenarios, the system is not limited to dividing the digital space estate into equal portions. It is fully capable of dividing the digital space estate(s) 316 into additional unequal time-varying time slots based on the digital space estate management company administrator preferences as well as releasing digital space estate(s) 316 back on the digital space estate market for resale by an existing digital space estate owner. The figures referred to should not be considered as conclusive but rather one of many variations that can be used to present hours, minutes and seconds for digital space estate timeline grid. More listing of different digital space estate scenarios can continue but the conclusive point is that the digital space estate management system has the flexibility to come up with a variety of different schemes for digital space estate time slot lengths on any given digital display node 710 within the universe 1602 of digital display nodes.

Figure 2:
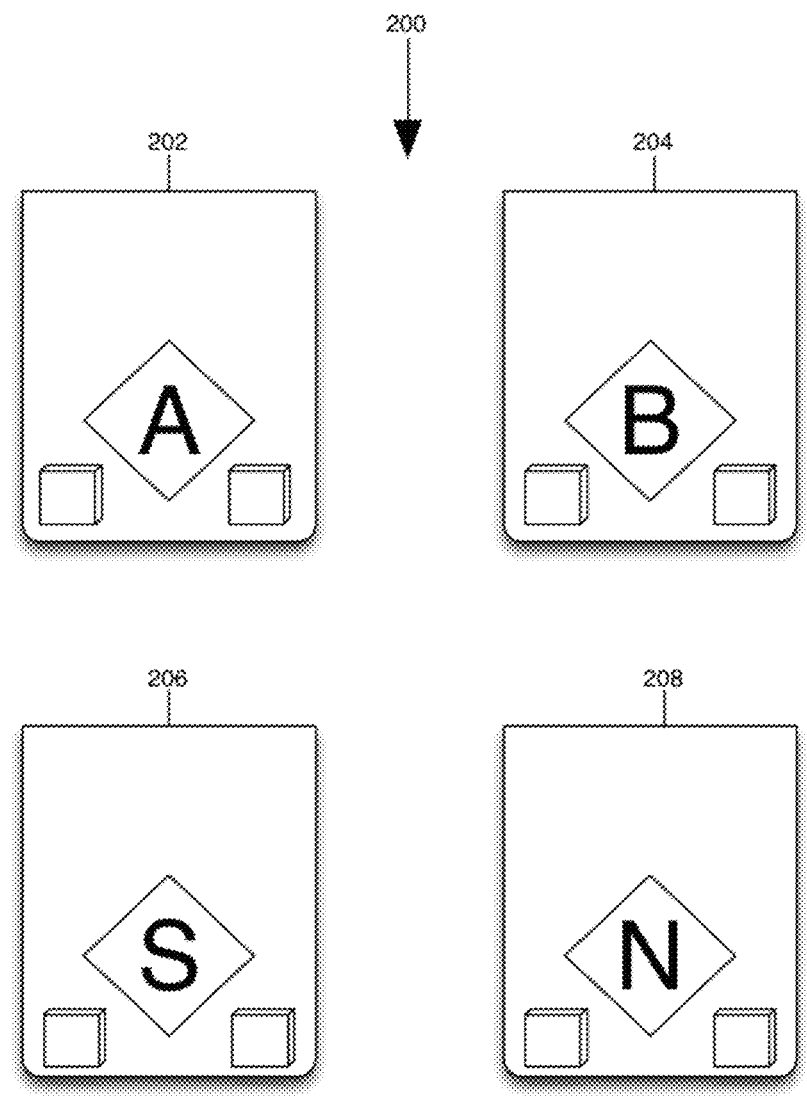
FIG. 2 is a perspective view of the digital space estate bins and the bin names of the present invention.
Figure 23A:
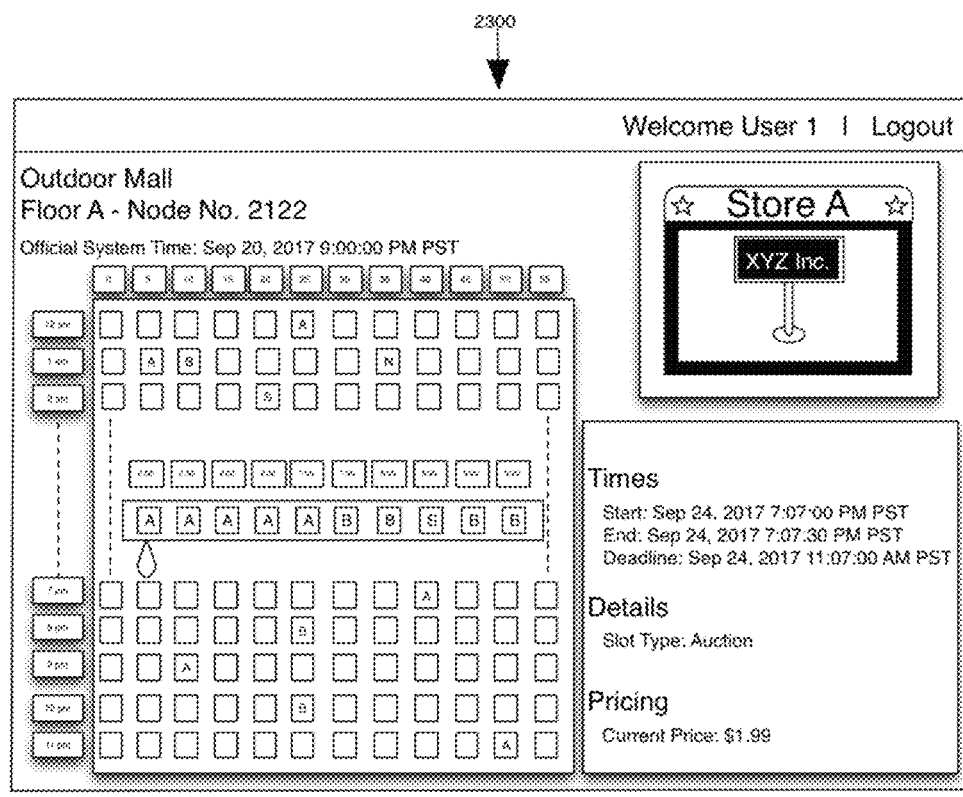
FIG. 23A illustrates an acquisition offer user interface.
Figure 23B:
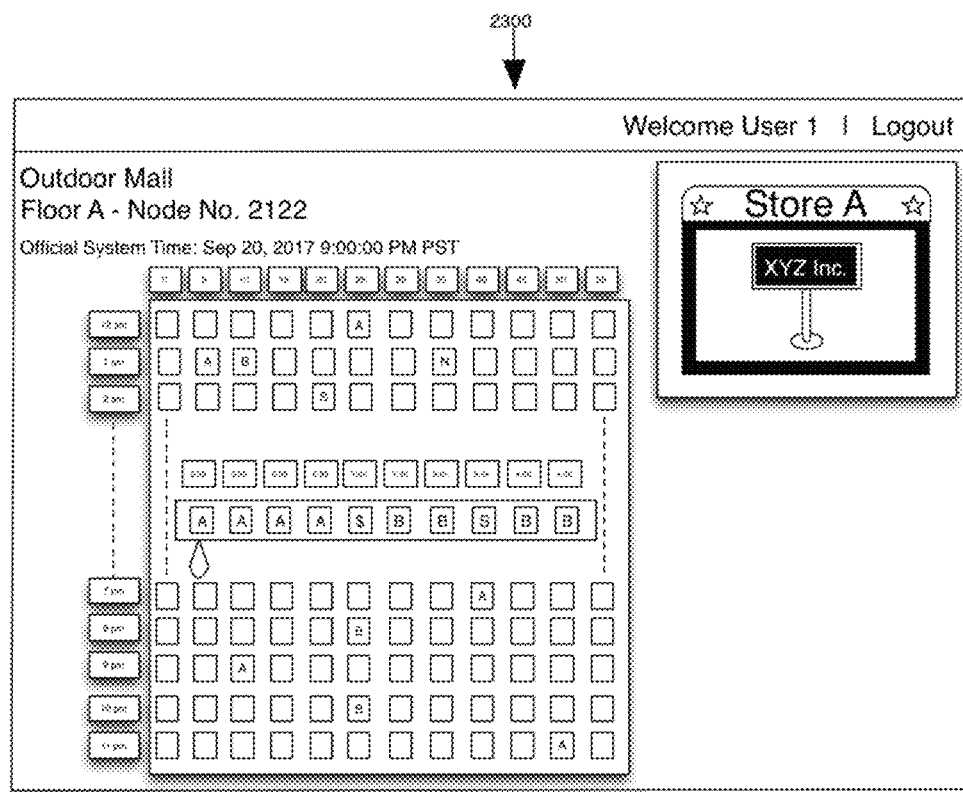
FIG. 23B illustrates updating of the user interface of FIG. 22 based on an acquisition offer.
Figure 23C:
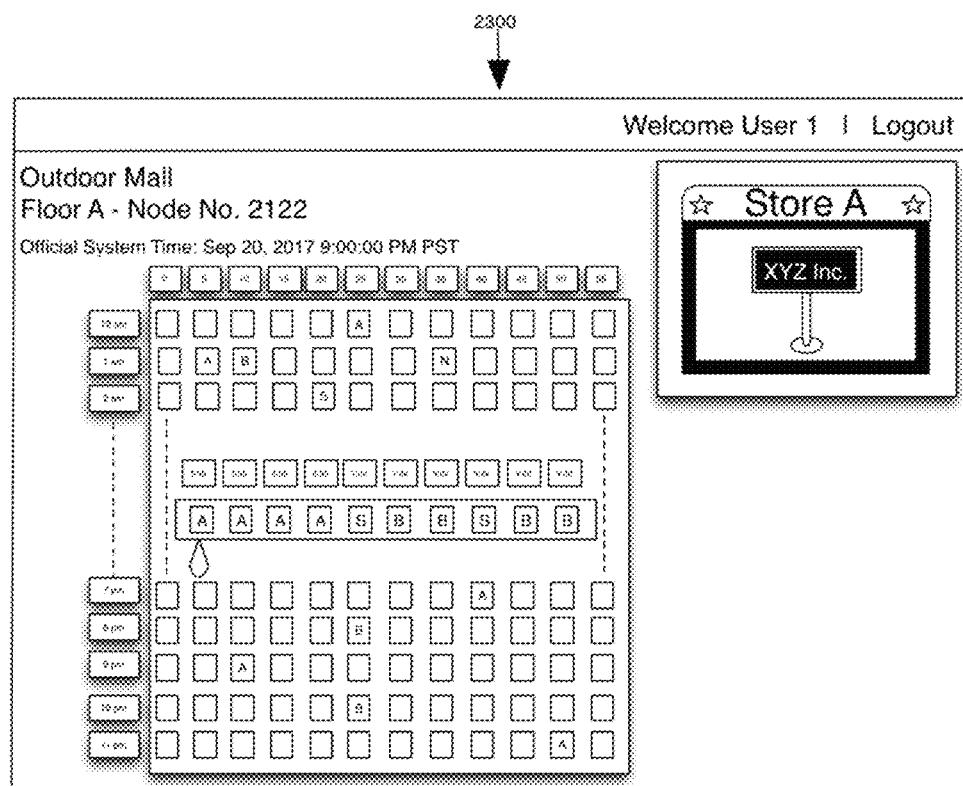
FIG. 23C illustrates updating of the interface of FIG. 22 after a digital space estate has been acquired.

The purpose of the digital space estate timeline grid 314 is for allowing users to attempt to schedule content for presentation on any one of a number of digital display nodes during one or more timeslots that includes analyzing timeslots as digital space estates 316 defined by different characteristics determined by market conditions. Users are provided with an interface for a web service portal 1302 as seen in FIG. 13 configured to allow a user to select their desired time slot for one or more digital display nodes for the purpose of publishing their content to their target audience. Digital space estates come in different forms and are part of a collective digital space estate set seen in FIG. 1, which shows individual digital space estates 316 and their respective full names. Digital space estates can be defined in four different ways labeled in FIG. 2 with letters for illustration purposes but can be represented in various ways among which could include color and symbol coding on the web service portal 1302. The letters seen in the FIG. 2 are labeled as: "N", "B", "A", & "S". These are used in FIG. 2 to separate bin types that contain the individual digital space estates 316 seen with their full names in FIG. 1. "N" 208 is used to symbolize the bin that contains "Not Available" 106 digital space estates 316, "B" 204 is used to symbolize the bin that contains the "Buy It Now" 108 digital space estates 316, "A" 202 symbolizes the bin that contains the "Auction" 110 digital space estates 316, and finally "S" 206 represents the bin that contains the "Sold" 104 digital space estates 316. Both "B" 204 and "A" 202 mean that the digital space estate(s) 316 are available for purchase in the open market. "N" 208 means that a digital space estate(s) 316 is not available for purchase. "S" 206 means that the digital space estate(s) 316 have already been purchased. When users are searching through the available inventory of digital space estates 316 they may come across digital space estates termed as "N", "A", "B" or "S" as seen in FIG. 2. To further illustrate a more detailed analysis of each category, a digital space estate that is "Not Available" 106 is closed for administrative or various other reasons. "Sold" 104 spaces are digital space estates that have already been purchased by the current or other users. Finally there are the two important types of digital space estates left. With the digital space estate(s) 316 designated as "Auction" 110, the digital space estate management system receives user input corresponding to a desire on behalf of one or more users of the system to place an acquisition offer on one or a number of digital space estates each of which has a given duration of time and may be on one or more displays throughout all possible locations registered with the digital space estate management system. The "Auction" 110 digital space estate are available for any number of users to put in their best acquisition offer amounts or successive acquisition offer amounts within a specified duration of time until it is deemed the highest and best offer amount. Successive acquisition offers from different or the same users will naturally raise the price of the digital space estate in contention. Once the specified duration of time has expired and it is deemed the best offer after the offering period is over, the user with the best offer becomes the digital space estate owner and their uploaded and prescreened digital content gets scheduled for display on one or more of the various digital display node(s) 710 in the digital display node universe 1602. As an example, with respect to the interface of FIG. 22, a user can select the grid square corresponding to a 7:07 time slot to offer an acquisition amount for that time slot. This will in turn effect the presentation to the user of an acquisition offer interface, as illustrated in FIG. 23A, which will allow the user to view the number of currently offered acquisition amounts for that particular time slot and the current highest offered acquisition amount. In one or more preferred implementations, if there are currently no offered acquisition amounts offered, a minimum acquisition offer amount may also be displayed. This interface will further allow the user to select one of several displayed proposed acquisition offer amounts, or input their own unique acquisition offer amount. This interface preferably further allows a user to select digital content, such as an advertisement, for display. In this example, since no offers were previously submitted, once the user inputs an acquisition offer amount and hits submit, the interface will be updated to indicate that the user has the highest acquisition offer amount for the 7:07 PM time slot, as illustrated in FIG. 23B. Preferably, acquisition offers for a time slot will continue to be accepted for that time slot until a closing time associated with that time slot, which is until the end of an offering period for that time slot. At the end of that offering period and after the user with the highest acquisition offer is chosen, the acquisition offer interface is updated again to indicate the digital space estate with an "S" as seen in FIG. 23C to indicate that the time slot has been sold. While in one implementation the interface can be updated with letters as seen in the diagrams, in other implementations colors may be used with a legend describing which color is assigned to which category. For example, in one or more preferred implementations, the color orange can represent a digital space estate that is in the "Auction" category otherwise known as variable priced time slots, the color blue can represent a digital space estate type of "Buy It Now" otherwise known as a fixed price time slot, the color red can represent a digital space estate type that has been "Sold", and the color gray can represent digital space estates 316 that are locked by the system administrator and not available for sale. In one or more preferred implementations, after a user enters an acquisition offer to acquire a time slot for a specific offer amount, the user may be informed if another offer with a higher offered acquisition amount is received from another user. In one or more preferred implementations, a user is informed, for example, via an interface of a web service portal 1302, via text message, and/or via an automated phone call. In one or more preferred implementations, a message includes an easy reply button, which preferably allows a user to offer a higher acquisition amount. In one or more preferred implementations, such a communication includes an indication of an acquisition amount the user must offer in order to supersede the current acquisition offer amount. In one or more preferred implementations, such a communication may alternatively or additionally include an indication of one or more other time slots, either associated with the same digital display node 710 or with one or more unique digital display nodes, that a user may be interested in. These other time slots may represent, for example, time slots determined to be similar to the time slot the user proposed to acquire. After the offering period ends, the user with the highest acquisition offer amount is granted ownership of that time slot. The digital content of that user would then be scheduled to run on the digital display node 710 for which that time slot was acquired. In one or more preferred implementations, once a user has acquired a time slot, the user indicates content to run during the time slot, which content is preferably stored at a data store of the system and communicated to the appropriate display (either ahead of time or streamed during the appropriate time slot) for display during the scheduled time.

The other known as a "Buy It Now" 108 digital space estate type designates a time slot that is available for immediate purchase at a fixed amount. This type of digital space estate is useful for users and content publishers that don't wish to engage in a free market battle for a digital space estate and allows the user to purchase the digital space estate immediately for a fixed cost. For example, in the interface of FIG. 22, time slots available at a fixed acquisition amount are indicated with a "B". These time slots are time slots that can be acquired by a user for a preset fixed price. Once a fixed price time slot is acquired by a user, its status is updated to indicate that is no longer available for purchase by others as seen in FIG. 22 with the letter indicator in the time slot labeled "S", and that it is scheduled to run for that user. In one or more preferred implementations, an interface further is configured to identify other status types. Time slots available at variable acquisition amount are indicated with an "A". For example, the interface of FIG. 22 is configured to illustrate time slots where offers have been received from other users, time slots where a user has submitted an offer but no longer has the highest acquisition offer amount. When these time slots are finally acquired, their status indicator is updated with an "S" as seen in FIG. 22 to indicate they have been sold and scheduled to run for that user. The same process of scheduling uploaded and prescreened digital content for display as the "Auction" feature is employed here.

Figure 4:
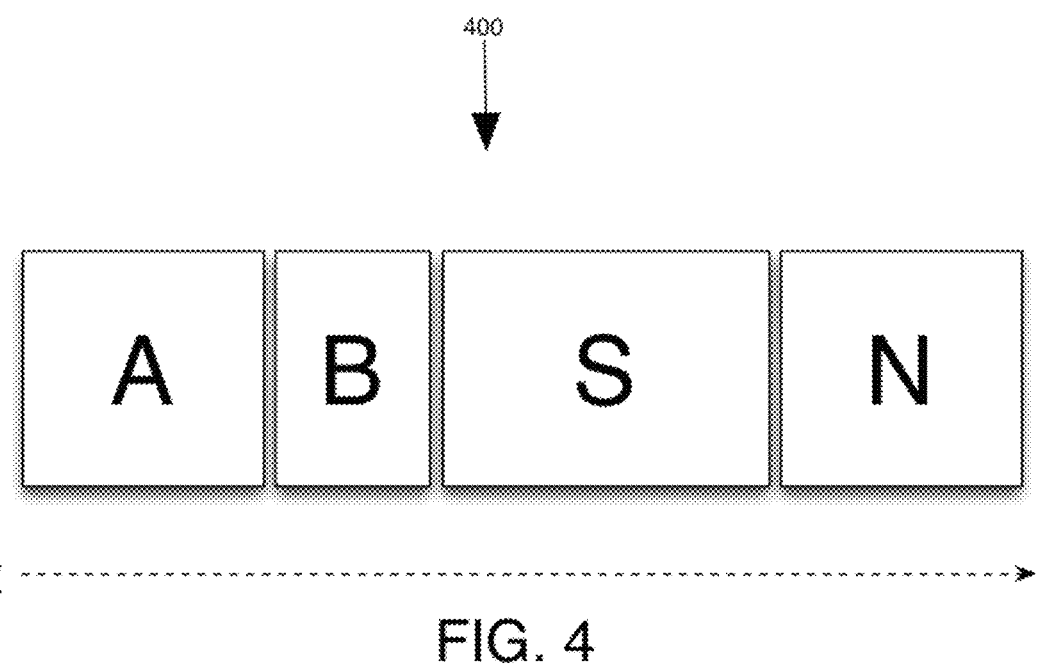
FIG. 4 illustrates the system of digital space estate bin interlacing and mingling.

In another embodiment of the invention, as a result of the various types of digital space estates 316 available, there will naturally be digital space estate type mingling that is seen in FIG. 4 within this digital space estate ecosystem. This means that for any given digital display node(s) 710 and for any given digital space estate timeline grid 314 on various digital display node(s) 710, the types of digital space estates 316 available for purchase can be interlaced. An interlaced time slot may be configured to allow for a predefined number of pieces of content, which will be rotated throughout the interlaced time slot. This means that when these digital space estate(s) 316 are offered for sale and when viewed along the x-axis 304 in FIG. 3 in which are minutes (seconds) within one of the hours represented by y-axis 306 of rows in the grid, a user of the web service portal 1302 in FIG. 13, will see several digital space estate types as seen in FIG. 1 to choose from. This could result in a "Not Available" 106 digital space estate encompassed by a "Buy It Now" 108 on the left and an "Auction" 110 based digital space estate type space on the right when thinking of the digital space estates 316 as small blocks of time along the x-axis 304. This is just one of the full possible amounts of combinations these digital space estate types may appear in. In addition to any order of digital space estate types on the grid, as seen in FIG. 4 the "B", "S" and "A" digital space estate types are of varying lengths to illustrate that the system is not limited to equal blocks of time but rather is flexible to accommodate any number of minutes or seconds within that hour. The "A" and "N" are of equal time duration to show that this scenario is also an option. Preferably, an interface includes a bar, which indicates how many slots are still open in an interlaced time slot. Although largely described thus far with reference to time slots for a single digital display node 710, in one or more preferred implementations, a web service portal 1302 is configured to allow a user to acquire time slots for multiple digital display nodes.

Figure 24:
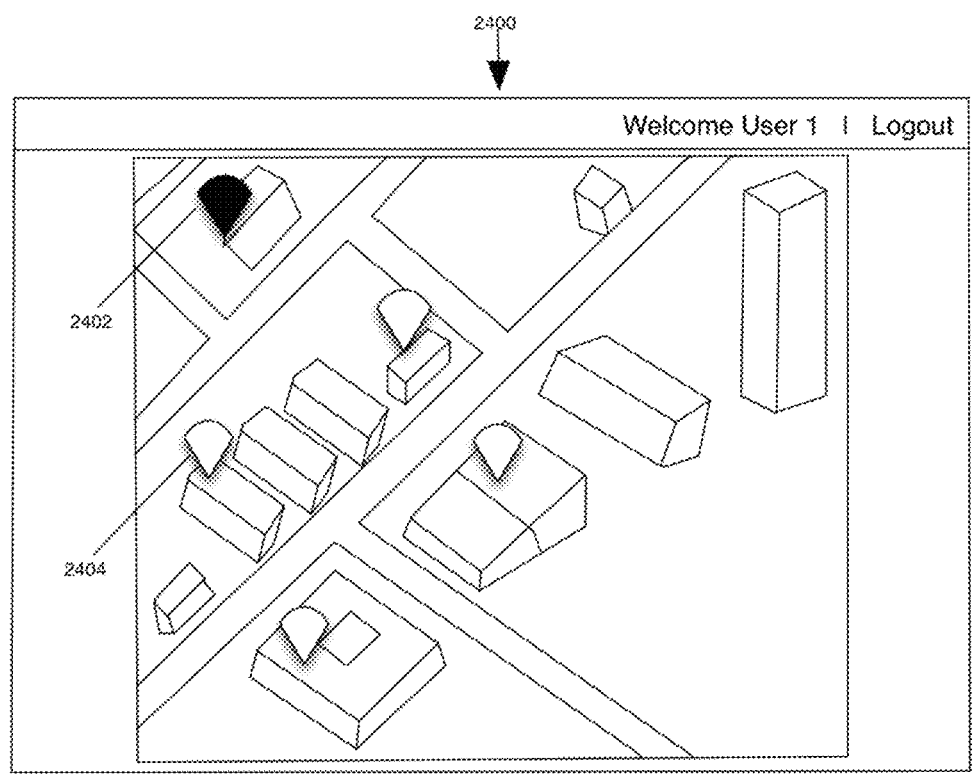
FIG. 24 illustrates an exemplary interface comprising a location map illustrating several digital display nodes.
Figure 25:
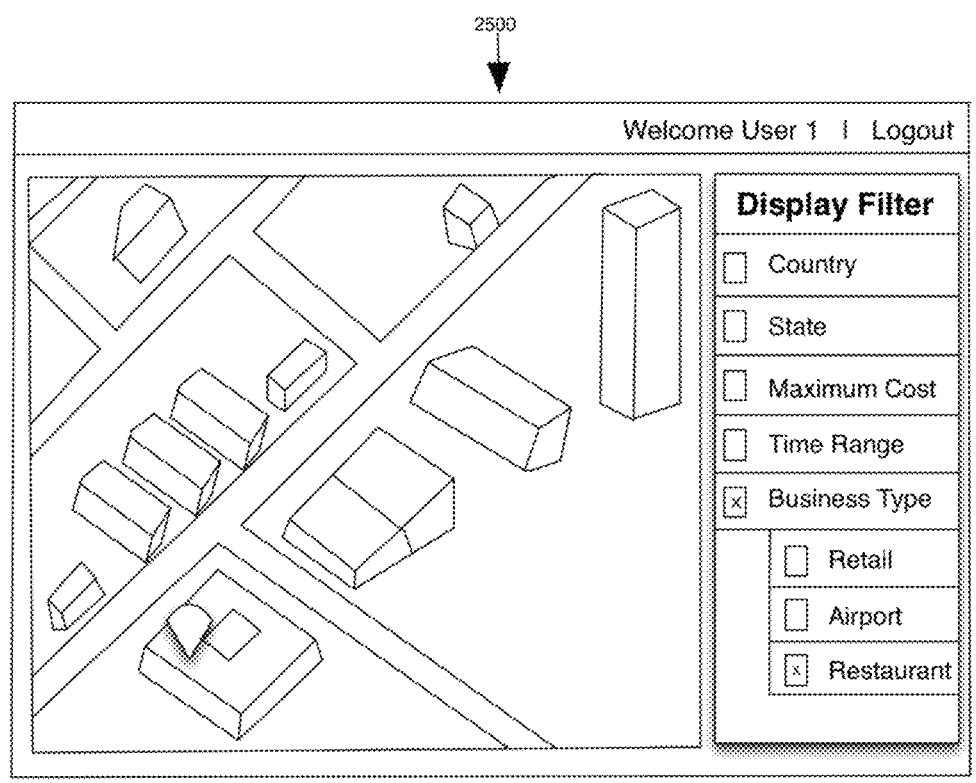
FIG. 25 illustrates a digital display node filtering interface.
Figure 26:
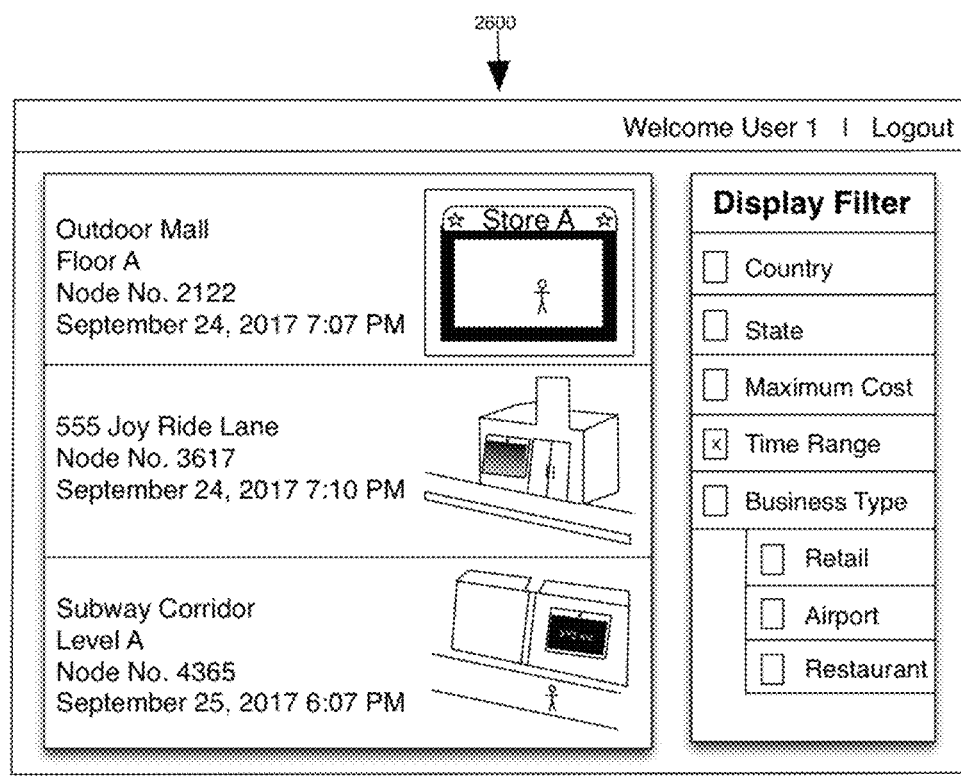
FIG. 26 illustrates an exemplary interface comprising a plurality of available digital display nodes automatically identified based on user input criteria and presented for consideration by a user.

In one or more preferred implementations, a user can search for digital display nodes located proximate to a specific location (e.g. having a location attribute with a certain distance of specified location or falling with a certain range or region) in order to try to acquire one or more time slots on such a display. FIG. 24 illustrates an exemplary interface comprising a location map illustrating available digital display nodes. In one or more preferred implementations, these digital display nodes are color coded or shaded to indicate status information or other information associated with these digital display nodes. For example, with respect to the interface of FIG. 24, white pins represent online 2404 digital display nodes while black pins represent offline 2402 digital display nodes. In one or more preferred implementations, a system is configured to allow a user to specify particular criteria for performance of a query, which returns digital display nodes likely to be of interest to a user. Looking back at the example of FIG. 24, a user can further specify criteria to filter results by, as illustrated in FIG. 25, which will in turn effect filtering of the displayed results based on such input criteria. Accordingly, FIG. 25 illustrates only digital display nodes, which match the user input criteria that the digital display node 710 is disposed in a retail location. Digital display nodes can be filtered based on any criteria associated with a camera or time slot for a camera, such as, for example, an available duration a time slot cost, a digital display node 710 location, a category or type associated with a digital display node's location, a historical average of traffic at a digital display node 710 (e.g. predetermined or automatically determined using a camera at the digital display node 710), and a type of content a digital display node 710 was previously leased for. In one or more preferred implementations, rather than simply filtering digital display nodes based on input criteria, a most preferred digital display node 710 might be automatically determined based on a score calculated based on user preferences or input, while in one or more other preferred implementations several digital display nodes selected based on such a score might be presented to a user for potential selection. For example, FIG. 26 illustrates an exemplary interface comprising a plurality of available digital display nodes automatically identified based on user input criteria and presented for consideration by a user.

Figure 6:
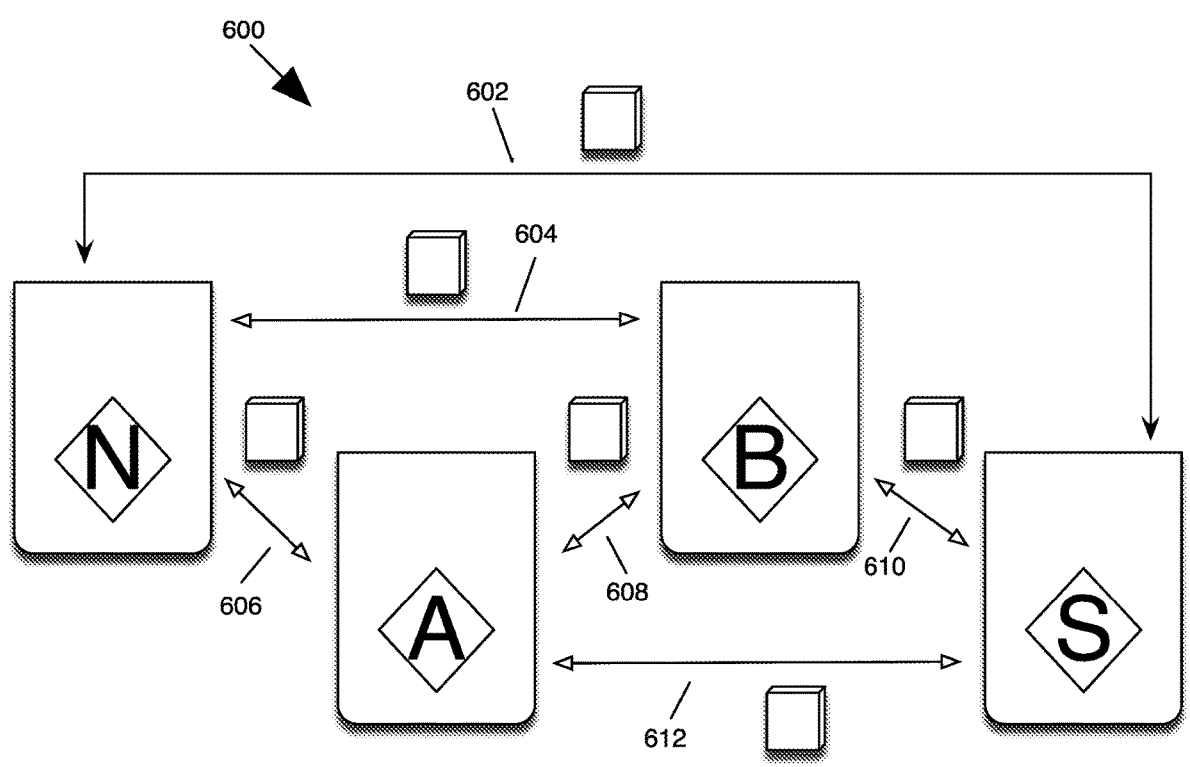
FIG. 6 is an illustration of digital space estate migration.

In one or more preferred implementations, a feature of the digital space estate management system is the concept of migration seen in FIG. 6. Digital space estate migration refers to the ability of the digital space estate management system to redefine and reassign digital space estate types. Spaces within the entire digital space estate management system can migrate from one bin type to the other depending on location and scheduling for digital display node 710 locations on any given day. This allows a natural evolution of time slots from one designation to another. In FIG. 6 two-way "N" to "S" digital space estate bin type migration 602 along with "N" to "B" 604 migration, "N" to "A" migration 606, "A" to "B" migration 608, "B" to "S" 610 migration, & "A" to "S" migration 612. The reverse fixtures of some of the aforementioned bin type migrations were not mentioned because two-way implies the ability to migrate to and from bin types. It is important to note, however, that this reassignment of digital space estate types can only happen before a user purchases the digital space estate(s) 316 in question. Once purchased, the system will never reassign or redefine the digital space estate type that was acquired by a user of the web service portal 1302 in FIG. 13. An example to illustrate the reassignment process would be a locked digital space estate transitioning from a "Not Available" 106 type to an "Auction" 110 type.

In another embodiment, there is a concept, which was previously briefly discussed known as the digital space estate offering period. The digital space estate offering period is an amount of time associated with all "Auction" 110 based digital space estates 316. Within this time frame, an unlimited number of other users may choose to offer their best acquisition amounts. Offers from the competing users is stored on the remote management server(s) 1304 or whatever data storage unit is necessary to compare all offers on a given digital space estate. Throughout the competing price raises of the auction, the system may or may not choose to employ the use of an incremental estate acquisition offer methodology. If not using this, then the incremental value that is raised on the digital space estate for the next user to make an offer on will be a fixed non-incremental price assigned by the web service portal 1302 system administrator. This can be clearly seen as outlined by FIG. 10 in the fixed increment table 1004. This means that no matter what range of prices described in the fixed increment table 1004, the current acquisition amount offer labeled as "z" 1008 lies within the increment required for a given user to raise their acquisition amount to be the next highest bidder will always be "x" 1006. If, however, the incremental offer system is utilized, then the remote management server(s) 1304 will employ automatic incremental price raises based on the auto increment table 1002 seen in FIG. 10. This means that if the current acquisition amount offer labeled "z" 1008 in FIG. 10 placed by a user who is the current highest bidder is in the first defined price range of a<=z<=b ("<=" means "less than or equal to"), where "a" and "b" are defined by the web service portal 1302 system administrator, then the incremental step "x" 1006 will be the initial fixed increment as previously defined in the fixed increment scenario. Once "z" 1008 becomes high enough such that it ends up falling within the next price range (c<=z<=d), then the incremental step "x" 1006 will double from the original step such that the new incremental step is "2x". This process continues where each prior incremental step is doubled until it reaches the maximum step it could ever be which is "2048x", which covers any current offer of "z" 1008 that lies beyond the range of "w" where again "w" is a price defined by the web service portal 1302 system administrator. In the various rows of the table in FIG. 10, it can be clearly seen what the incremental steps are for the various price ranges. Communication is automatically maintained with the first and all subsequent users who put in acquisition amount offers on a given digital space estate in contention. Messages (text, email, phone, etc. . . . ) are sent to notify the user with the highest offer if their highest offer is no longer high enough. Upon expiration of the digital space estate offering period, determination is made on the stored offers on the remote management server(s) 1304 as to which user has the highest offer and the digital space estate in question is automatically purchased by that user. Scheduling of content for display on the digital display node(s) 710 is then put in motion and the user with the highest and accepted acquisition offer amount has their digital content sent for display to the public at the selected digital display node(s) 710 at the respective geographic location(s).

Figure 11:
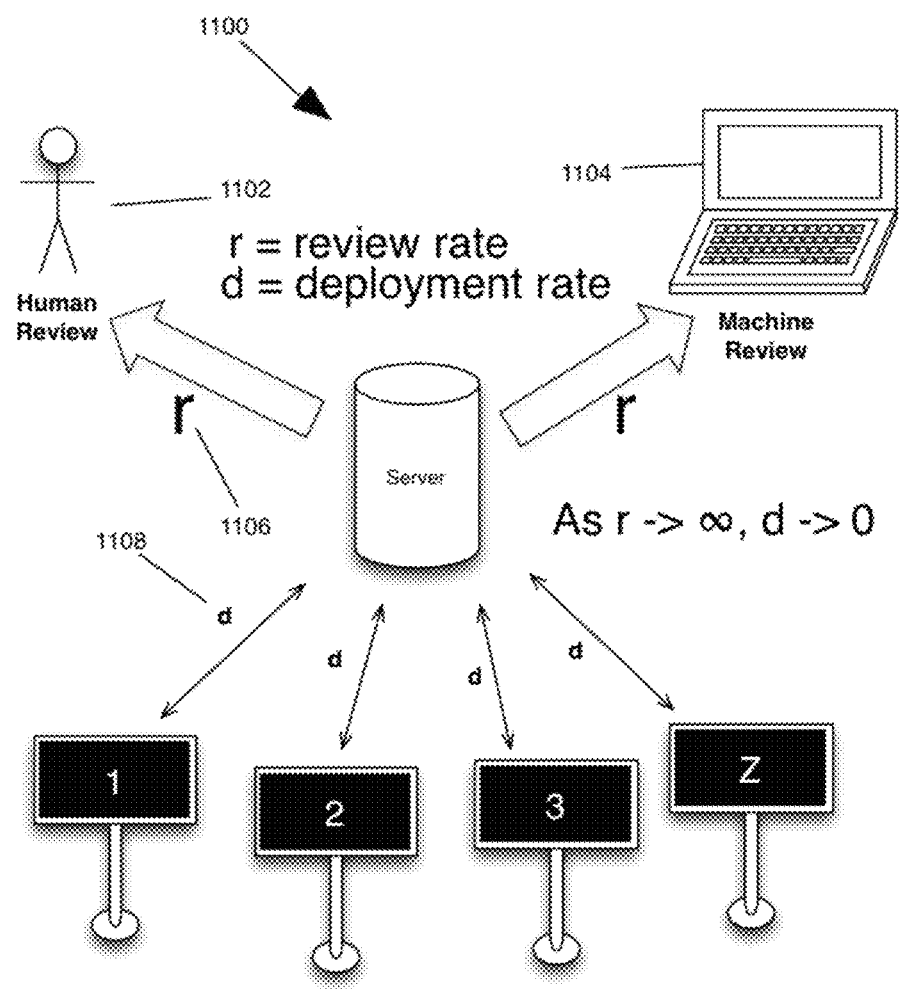
FIG. 11 depicts the concept of the content deployment rate employed in the present invention.

Once a digital space estate has been selected and purchased, the issue of digital content upload arises. Digital content material can be provided in one of two ways. One option would be that the user uploads their personally created digital content for display. Another option would be that the user employs the help of the digital space estate management company to create their digital content based on specified criteria and preferences. Once digital space estate(s) 316 have been purchased and digital content has been provided, digital content is pushed out to respective digital display node(s) 710. Initially the digital space estate management company starts out with a fixed time in which content review takes place and content is scheduled and pushed to the various digital display node(s) 710. This initial fixed time, however, is subject to increases or decreases based on "r" 1106 which is defined as the review rate seen in FIG. 11. This figure shows the calculation of a digital content deployment rate based on an increasing review rate "r" 1106. Deployment is done with the fastest turnaround time possible as defined as "d" 1108, where "d" 1108 is the amount of time it takes to deploy digital content to anyone of a number of digital display nodes and "r" 1106 as previously defined as the quickest approval time via a human review 1102 or machine review 1104. This major theme that can be seen in FIG. 11 is the fact that as the review rate approaches infinity the content deployment rate "d" 1108, approaches zero. What this essentially means is that the faster the digital space estate management system is able to make the review rate, the faster digital content can deploy to digital display node(s) 710.

In one or more preferred implementations, digital space estate attributes are used to search and filter digital space estates and identify digital space estates that match a user's specified query or preference. In one or more preferred implementations, a digital space estate management system is configured to allow a user to specify particular criteria for performance of a query, which returns digital space estates likely to be of interest to a user. In one or more preferred implementations, rather than simply filtering digital space estates based on input criteria, a most preferred digital space estate might be automatically determined based on a score calculated based on user preferences or input, while in one or more other preferred implementations several digital space estates selected based on such a score might be presented to a user for potential selection. For example, in one or more preferred implementations, a user might indicate a general industry or type of business the user is interested in presenting content for, and the system might determine, based on digital space estate attributes and/or past content presented in similar digital space estates, one or more digital space estates suitable for such digital content. In one or more preferred implementations, a system provides a web service portal 1302 which allows a user to access system functionality via a web browser or dedicated application, such as a mobile application available from a mobile application store. A user can access the system via an interface of a web service portal 1302 of the system, which interface allows the user to search for available digital display nodes or digital space estates. They stem preferably allows a user to filter digital display nodes or digital space estates by a variety of criteria associated with the digital display nodes or digital space estates. In one or more preferred implementations, the system is configured to identify one or more digital space estates that best fit, based on a relevance score, a user's indicated preferences.

In one or more preferred implementations, recommendations further might utilize intelligent decision-making, which evolves as additional data is collected. In one or more preferred implementations, a system is capable of learning over time from the information that it senses as well as the choices of the users. Exemplary inputs utilized by the system might include weather patterns which are of importance for outdoor digital advertisement (this may be of great importance for choosing the types of graphics used in the advertisement, for example, vivid colors may be needed for digital content displayed on rainy days), and traffic patterns of roads where the displays are mounted, and indoor traffic patterns (which might be determined utilizing computer vision techniques to count viewers in front of a digital display node 710). In one or more preferred implementations, such data is utilized to optimize viewership for digital content, such as a digital advertisement. For example, the system can propose digital display nodes for users. The proposals can be based on machine learning technology including neural network technology, genetic algorithm technology, Bayesian probability based on decision making, look-up tables, statistical signal processing, Kalman filters for prediction in dynamic systems, and automatic control techniques such as system estimation and optimal control techniques. In one or more preferred implementations, user feedback might be utilized to inform future recommendations. For example, in one or more preferred implementations, a user who acquires a digital space estate might rate their satisfaction level with the digital space estate on ten various criteria (e.g. foot traffic, ROI, etc.) on a fixed scale (e.g. one to ten stars), and use such satisfaction data in determining a score for each digital space estate. In one or more preferred implementations, users acquiring or attempting to acquire a digital space estate might be prompted to provide input related to their reasons for wanting to acquire the digital space estate.

Returning to the scenario of the variable priced auction where a user who had a previous leading acquisition offer amount no longer has the highest acquisition offer amount, wherein the system communicated with that user to suggest the next highest acquisition offer amount necessary to become the leading proposal. The system can further determine, based on shared attributes or characteristics, a similarity score and/or user preferences, one or more digital space estates that are similar to the digital space estate the communication is being sent for, and includes an indication of one or more such similar digital space estates. For example, consider a scenario where a first user submits an acquisition offer for a first thirty second time slot at a first exterior digital display node at an Outdoor Mall on Floor A for 7:07:00 PM on September $24^{th}$ with an acquisition offer amount of $1.99, and a second user then proposes to acquire that same time slot for $3.99. In one or more preferred implementations, the system would compare the digital space estate representing that time slot the first user offered to acquire to other available digital space estates in the inventory for which data is stored in the system, and determine that an available second one minute time slot at a second exterior digital display node at 555 Joy Ride Lane for 7:10:00 PM on September $24^{th}$, which is available for $2.49 has a similarity score of 0.95, representing the highest similarity score of any digital space estate available in the inventory. The system then, in communicating to the first user that they no longer have the highest acquisition offer for the first time slot, preferably also communicates the availability of the second time slot, which has been identified to be similar to the first. FIG. 27 illustrates an exemplary communication including such a recommendation.

Figure 5:
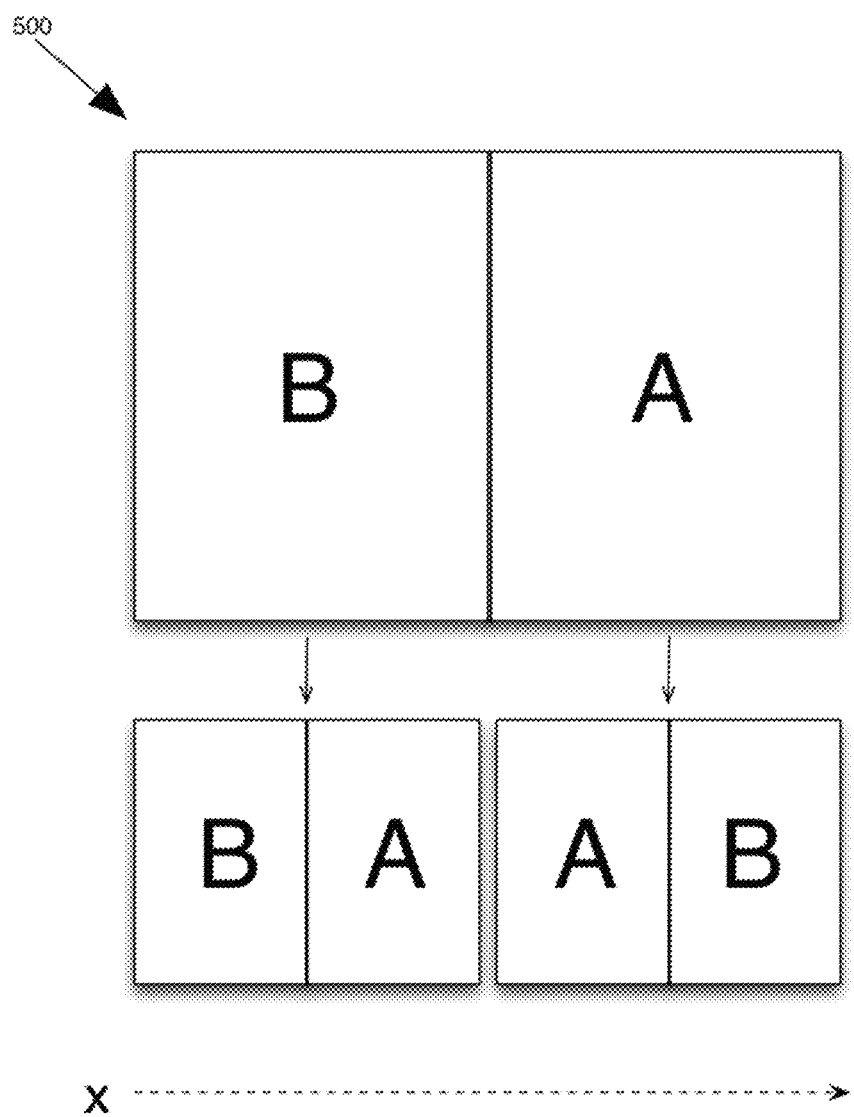
FIG. 5 is a perspective view of the concept of a digital space estate resale scenario.

In one or more implementations, there may be a period of time between the purchase of a digital space estate and the publishing of digital content on that digital space estate which exceeds even the mandated and fixed content review time period. Among other things, this extra time may be used as in the case previously mentioned for general content screening for appropriate digital content as well as more specific content screening as in the case of digital content filtering seen in FIG. 15. However, if this period of time is long enough, where long enough is defined as exceeding the system fixed mandatory time for content review before publishing and if the owner of the digital space estate does not wish to publish his or her own content, they can relist the digital space estate in question back on the open digital space estate(s) 316 market. This period of time is known as the digital space estate resale period and digital space estate(s) 316 already purchased will be made available for purchase by another user of the digital space estate management system. In FIG. 5, an example of this is shown in the form of two digital space estate types. One shows an original "Buy It Now" 108 digital space estate type being relisted and sold as a mix between a "Buy It Now" 108 and an "Auction" 110 based digital space estate. The other shows an original "Auction" 110 based digital space estate being sold as "Auction" 110 based and "Buy It Now" 108 digital space estate types. A digital space estate can be relisted in two main ways. One option is the case in which the initial owner of the digital space estate or secondary purchaser of the additional digital space estate indicates a request via the web service portal 1302 that the digital space estate management system should advertise their allotted digital space estate. Another option is the case in which the initial owner advertises the digital space estate of their own accord, through the method of sharing that information with the public via their own form of advertisement or through the Internet in the form of posting a hyperlink on any Internet location of their desire, that directs others to the digital space estate management company's web service portal 1302 used in the present invention as discussed here. There will also be a market for resale provided within the digital space estate management company's web service portal 1302 such that a plurality of digital space estates 316 can be resold. The user who wishes to list their digital space estate on the resale market, may for example, divide a one minute time slot into two thirty second time slots or a two minute time slot into four thirty second time slots and sell just one of the thirty second time slots, such as a user that previously submitted an acquisition offer for the one minute time slot. Alternatively, rather than subdividing a time slot into two or four time slots, a time slot can be divided into a plurality of interlaced digital space estate mingling time slots. In the case of successful sale and resale of digital space estates 316 by users, a system operator hereto referred as the digital space estate management company, preferably receives some percentage of revenue generated from both the initial sale and resale. Although, the resale of divided time slots have referred to even splits, the system is configured to allow a user to divide their digital space estates into any number of time slots for resale on the digital space estate market. With regards to any digital space estate resale and time slot sharing the concept of rights of the acquirers of the digital space estate(s) 316 comes up. Limited rights are granted to both initial, secondary and any number of future purchasers of digital space estates 316 with full set of rights being reserved by the digital space estate management company who is the administrator of the digital space estate management web service portal 1302. As part of the digital space estate resale aforementioned, it is possible that a user can become the owner of consecutive digital space estates 316 on one or more digital display nodes. If that owner wishes, they can sell their time slots in two main ways that may be provided by the digital space estate management company. One is a method in which they sell a given digital space estate with full user rights granted to the new owner. The second option is the method in which limited rights are granted to the new owner. With full user rights in the first method, the new owner is able to schedule any digital content of his choosing to be published on the digital display node 710 and will have the same exact rights as the initial owner. In the second scenario with limited rights, the original digital space estate owner may have chosen to only allow specific criteria of digital content to be allowed for publishing. Among various reasons for an initial owner to limit rights, one might be that the original owner wants to promote digital content that is related to their own content genre. In all case of user rights, as mentioned before, the digital space estate management company reserves full rights which are greater in number and in power of what can or can't be done to digital space estate(s) 316.

Figure 12:
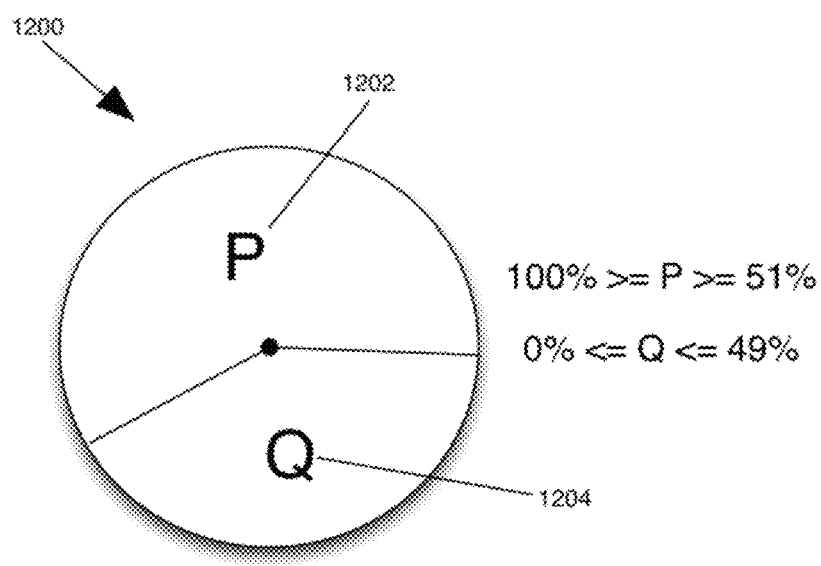
FIG. 12 illustrates the profit sharing equation used in the present invention.

In another implementation for the present invention, the digital space estate management system relies on the fact that the digital space estate management company is able to provide their own digital display nodes at various geographic locations or partner up with owners and/or operators (hereon referred to as node hosts) of existing real estate (businesses, schools, airports, government buildings, etc.) and provide them with digital display node(s) 710 for their locations across various geographic regions. An example of a node host can be seen in FIG. 15 with the representation of Store A 1502. In the second case, there arises a need to have some type of incentive in order for these node hosts of digital display node(s) 710 to allow the digital space estate management company to use them for digital content publishing. This will be known as a digital display node partnership methodology. This methodology is the implementation of profit sharing as seen in FIG. 12 between the digital space estate management company and said digital display node hosts where P 1202 & Q 1204 are defined as percentages; Q 1204 is the digital display node host percentage and P 1202 is a digital space estate management company percentage. P 1202 will always be greater than Q 1204 but the delta of difference can vary by geographic location and specific digital display node(s) 710 in question.

Figure 15:
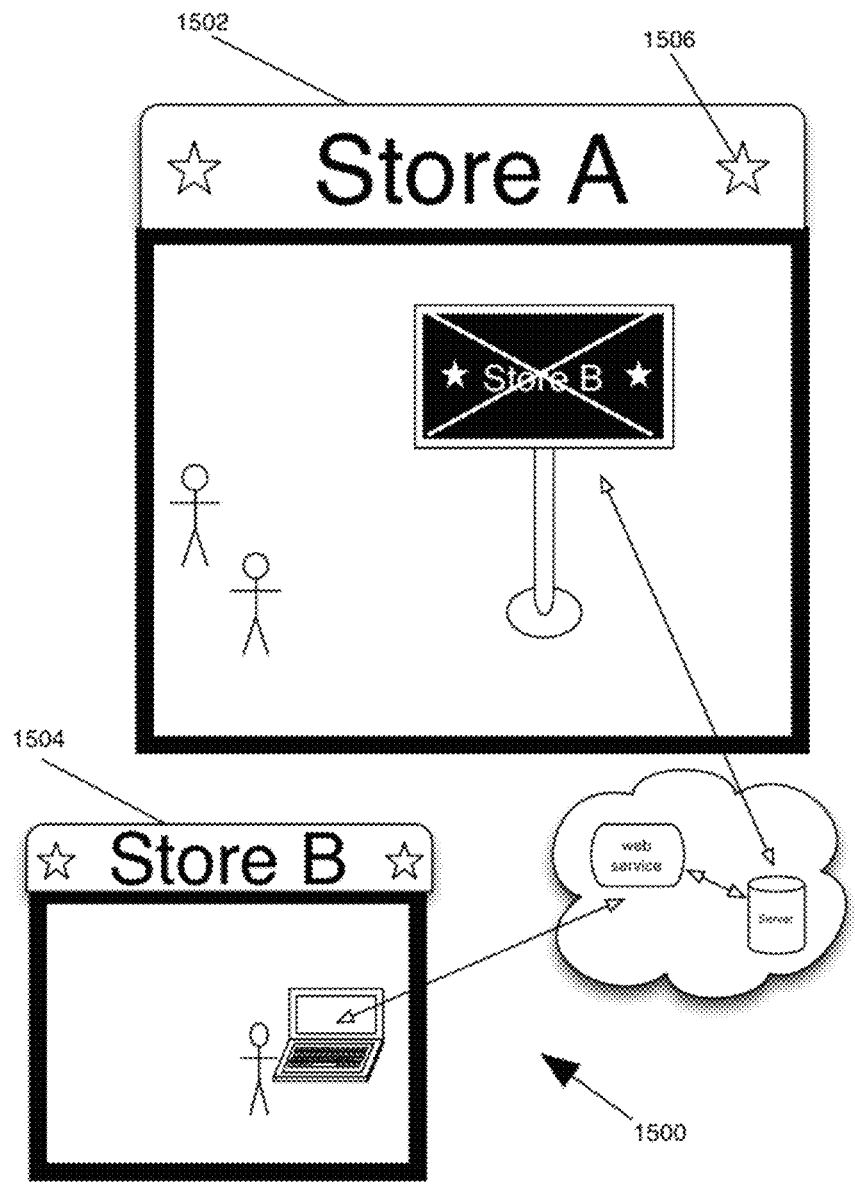
FIG. 15 illustrates the concept of digital content filtering.

In the previously mentioned implementation of the digital space estate management company partnering up with node hosts across various geographic regions, a very important feature of the system is employed which allows digital content filtering before digital content reaches the specific digital display node(s) 710 that are located on the premises of the node hosts. Digital display node hosts who wish to filter certain digital content from being displayed at their locations will have access to this feature of the system which allows them to block digital content submitted to their digital display node(s) 710 by competing stores. As seen in FIG. 15, if a store of type "star" 1506 where type "star" 1506 is represented by the star drawings on both the stores of FIG. 15, owns a display that another store of type "star" 1506 seen in the smaller store also represented with stars to show that is of type "star" 1506 attempts to send content to, then the remote management server 1304 will reject approval of digital content provided by the user of the competing store with type "star" 1506. This is done through a process called digital space estate filtering. This is a method for filtering and eliminating digital content display options based on user input (done via the web service portal 1302 or a smart phone 1308 application) that briefly described the digital media they are uploading for a digital display node 710 on a digital space estate. A software methodology employed by the digital space estate management company known as intelligent media sense (IMS) is used to match keywords provided to describe the nature of the digital content and automatically filter out digital display nodes that they are prohibited from effecting display on due to their desired digital content being regarded as a competitive or conflicting business type. The example in FIG. 15 to help illustrate this is, Store B 1504 of type "star" 1506 represented by the actual stars in FIG. 15 attempts to advertise their product in Store A 1502 of type "star" 1506. One will see that competing store display content is not allowed for scheduling on the display in Store A 1502. If, however, Store B 1504 were to upload digital content about an entirely different category then the transaction would be approved. As a backup to the filtering employed by the IMS implementation, the second method for digital content filtering is done through either automated computer analysis of the digital content to verify that it's not of a competing nature or a physical human review 1102.

With both this method of allowing digital display node hosts to become part of the digital space estate management company system and having the digital space estate management company owned digital display nodes in the market, there arises a need for digital display node 710 registration and tracking. In one or more preferred implementations, a system is configured to allow users to add one or more digital display nodes to the system, indicate the availability of the one or more digital display nodes to present digital content, and receive a portion of revenue for digital content presented via the one or more digital display nodes. A digital display node 710 can be added to the system quickly and easily by installing software on a device associated with the digital display nodes, which pushes content to the digital display node 710 based on instructions from the system. Thus there will be a system for registration and bring up of business, retail location, or any type of individual or organization that desires to be a node host of a digital display node 710. Methodology comprises of registering the new digital display node in an authentication table 702. This authentication table 702 will consist of a newly assigned unique display identification number as well as the existing media access control (MAC) address of the device and storing it on an authentication table 702 in a relational database on the remote management server(s) 1304 used to identify digital display node locations as in FIG. 7. Communication between digital display node(s) 710 and the remote management server 1304 is done via this methodology of handshaking 704 that employs MAC address mapping and referencing to unique displays via Java and HTML5. This handshaking 704 will allow for proper remote management server(s) 1304 communication and a digital display node software application that has handshaking 704 capability with the remote management server(s) 1304 for uniquely tracking all digital display node systems. This guarantees that digital space estate purchases for the digital display node 710 are appropriately filled based on user location. Additionally as part of this streamlined digital display node registration process, there is a feature that allows for the streamlined integration of a digital display node 710. This allows for the digital display node 710 to be registered instantaneously as an official digital space estate management company digital display node 710. Essentially this gives the ability for a human who runs or owns the location in which the digital display node 710 will be connected to the digital space estate management company network (customers being defined as the user(s) registered with digital space estate management company system as either a digital content provider or a node host) may have the ability at any time to turn their personally owned digital display node(s) into an official digital display node 710 on the system. This system requires permission from the digital space estate management company and after some verification of provided information, the digital display node(s) 710 in question would be pushed into the queue of available digital display node locations. If it's a temporary location that is marked to only be active in the system for a short period of time, then this would be accounted for in the remote management server(s) 1304 and there would be an expiration time set such that the digital display node 710 would go offline on a set date. In one or more preferred implementations, once a user adds a digital display node to the system, the user can monitor revenue generated by the digital display node 710, and modify availability of the digital display node 710 via a web service portal 1302. In one or more preferred implementations, software is provided which allows a business, marketing entity or any type of organization to create and monitor a closed system comprising digital display nodes it owns and/or manages.

Digital display node analytics is a feature of this system and comes into play in various aspects of the present invention. There is a system incorporated into digital display nodes for the processing and analysis of location-based information such as human interaction with digital display node 710 or current traffic conditions during specific or all times of day, through the use of an analytics system. Traffic conditions can be in the form of human foot traffic 1702 pictured in FIG. 17. It can also be in the form of automotive and various other transportation machinery not pictured. In one or more preferred implementations, a system is configured to receive feedback related to content presented via a display. For example, in one or more preferred implementations, one or more cameras are associated with one or more digital display nodes on which digital content is presented. In one or more preferred implementations, when a user's digital content is presented via a digital display node 710, obscured video (e.g. low pass filtered video) from one or more cameras associated with that digital display node 710 is stored and may or may not be provided to the user by the system. In one or more preferred implementations, automated analytics are further utilized. As an example, in one or more preferred implementations, software is utilized to analyze video or still images from a camera associated with a digital display node 710 to determine interest by individuals disposed proximate to the digital display node 710. In one or more preferred implementations, software tracks the gaze of individuals and determines, for example, how well digital content held a viewers' attention. This might include, for example, determining how many viewers viewed any part of the digital content (e.g. by ascertaining gaze information based on an image from a camera), or how long the average viewer viewed the digital content. Analysis of location-based information is done on each digital display node for every digital space estate of interest. This essentially means that the location analytics system constantly is running for operational hours of every digital display node 710 that is equipped with the analytics feature. This is done so that the digital space estate management system can keep record for activity at the digital display node(s) 710 for all time slots. The information processed by the analytics software is stored on the remote management server(s) 1304. All authorized digital content distributors and users of the digital space estate management system, will be able to view this information through the web service portal 1302, which receives and transmits data over any communications network standards that are currently employed.

Figure 8:
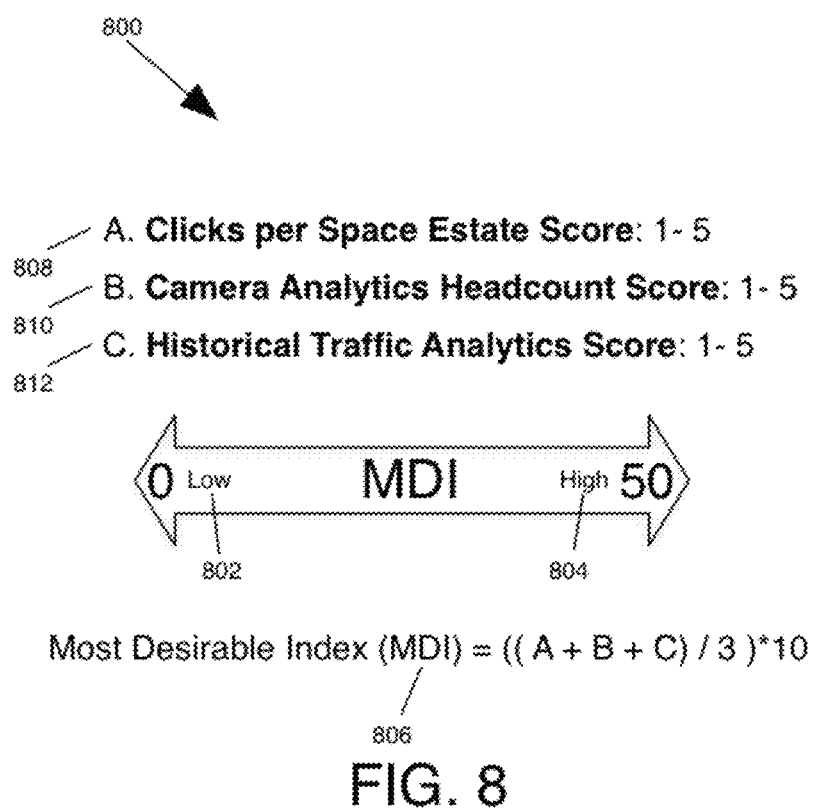
FIG. 8 illustrates the system employed to assign scores to digital space estates based on the concept of the three-dimensional desirability index.
Figure 9:
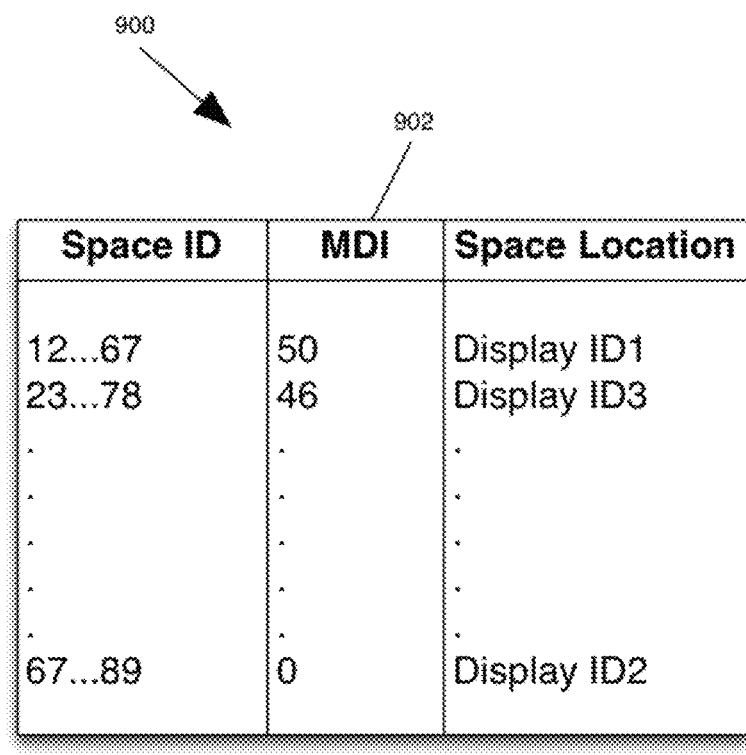
FIG. 9 shows how desirability index scores are translated to an MDI score that is stored in a queue on the remote management server(s)

An important aspect of the overall system is keeping a desirability index for digital space estate time slots to gauge the value for each digital space estate's effectiveness. In one or more implementations, the digital space estate(s) 316 may or may not have been initially found by one or more users of the system through the use of a filter that narrows digital space estates of interest down based on a calculated desirability index score. A most desirable index (MDI) score 806 may be assigned to all of the digital space estates 316 on the system. As seen in FIG. 9, an MDI queue is a relational database table 902 maintained on the remote management server(s) 1304 used to hold digital space estates with the varying degrees of desirability. After selection of one or more digital space estate(s) 316, the user input is stored on the remote management server(s) for the purposes of comparison with any further offers that come in on a given digital space estate of which the first user has placed an acquisition offer on. FIG. 8 shows the desirability system employed by the digital space estate management company known as the three-dimensional desirability index. The first dimension "A" 808 is the number of clicks per digital space estate. A score is kept for this parameter and is tracked on a 1 thru 5 score line. The second dimension "B" 810 that is tracked is the camera analytics headcount, which is also kept on a 1 thru 5 score line. The third dimension "C" 812 which is also based on a 1 thru 5 score line, tracks the stored traffic analytics of historically known times of high traffic for the specific digital space estate(s) 316 along the digital display node(s) 710 in question. All of these dimensions combined, form an MDI score 806 on a scale seen in the form of a two-way arrow in FIG. 8. The MDI score 806 is a formula which incorporates all three dimensions of scores and comes out with a final MDI score. Dimensions "A" 808, "B" 810 and "C" 812, are summed up, divided by 3 and multiplied by 10. In the middle of the arrow in FIG. 8, where the MDI score 806 lies on that line will determine the average desirability. On the left will be the least desirable "Low" scores 802 and on the right of the score line will be the most desirable "High" scores 804. MDI scores 806 are then stored in an MDI queue 902 which is a table as seen in FIG. 9, stored on a relational database on the remote management server(s) 1304. The MDI queue consists of stored digital space estate identification numbers along with the MDI score 806 for each digital space estate and the respective digital display node location indicated by the digital display node identification number.

Figure 14:
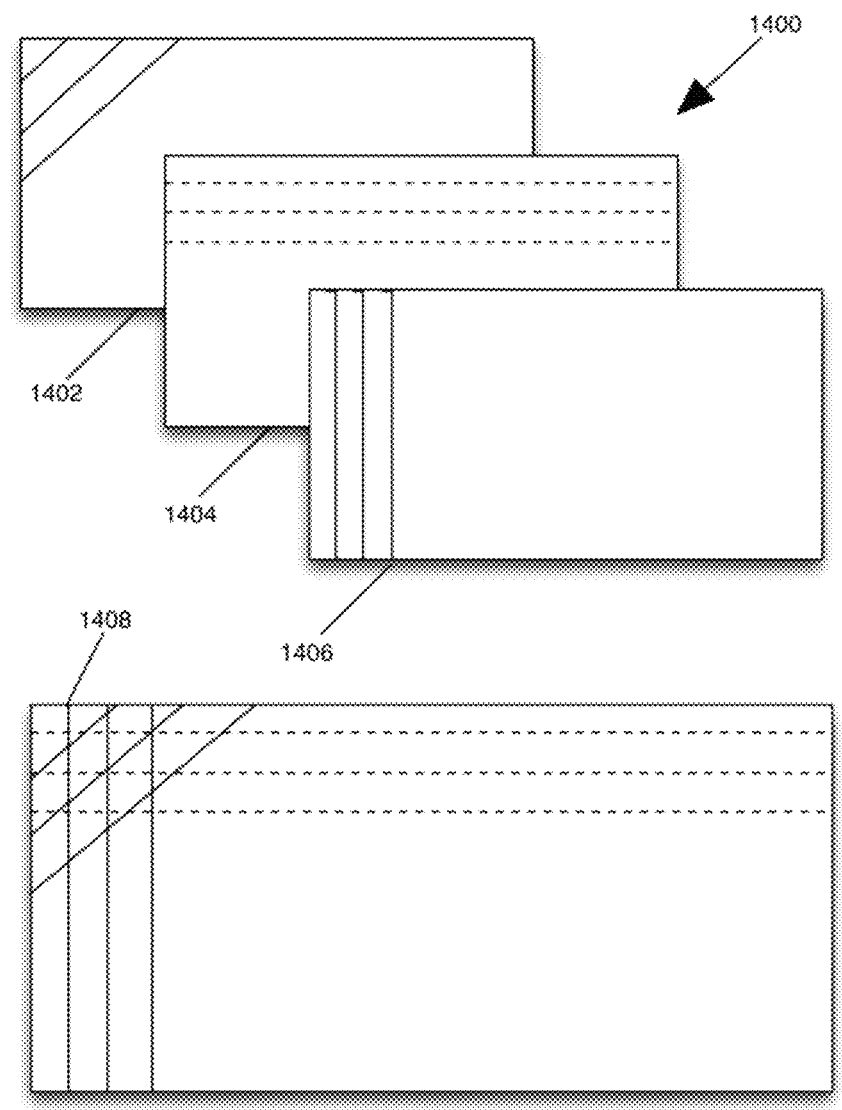
FIG. 14 is a perspective view of the desirability thermal map representation of the web service portal of the present invention.

The use of these desirability index scores allows the digital space estate management company to create a desirability thermal map shown in the web service portal 1302 representation seen in FIG. 14. This figure shows individual web service portal 1302 user interface representations for the three dimensions outlined in FIG. 8 along with the combination thereof for all three dimensions to create areas of "thermal" sensitivity for the most desirable segments of time along a digital space estate timeline grid 314 for any number of digital display node(s) within the universe of digital displays nodes. Essentially the system uses historical data already gathered to forecast the most desired digital space estates across all digital display node(s) 710 in the digital display node "universe" 1602. This allows the digital space estate management system to promote the digital display node(s) 710 across any number of geographic locations as ideal options to send digital content to. Dimension "A" 808 is symbolized by the diagonal solid black lines seen in the first user interface representation 1402. The horizontal dashed black lines seen in the second user interface representation 1404 symbolize Dimension "B" 810. Finally, the vertical solid lines seen in the third user interface representation 1406 symbolize Dimension "C" 812. As seen in FIG. 14, the lines indicate the areas in time along the entire digital space estate timeline grid 314 for any given digital display node(s) 710 in question that get high scores of 5 for the various dimensions of desirability aforementioned and seen in FIG. 8. Blank space is intentionally left in each of the three web service portal 1302 presentations to indicate scores of less than 5. The intention is to show that in very specific blocks of time the desire for a digital space estate is high. The combined user interface representation 1408 shows the crossing of all three types of lines in different areas. The points where they all cross each other represent the highest areas of "thermal activity" otherwise known as the most desirable digital space estate(s) 316. In summary, thermal sensitivity indicates digital space estate(s) 316 in time slots that are determined by the system to be the most sought out after time slots in the entire inventory of digital display node(s) across the entire "universe" 1602 of digital display node(s) 710 as determined by the MDI scores 806.

Figure 16:
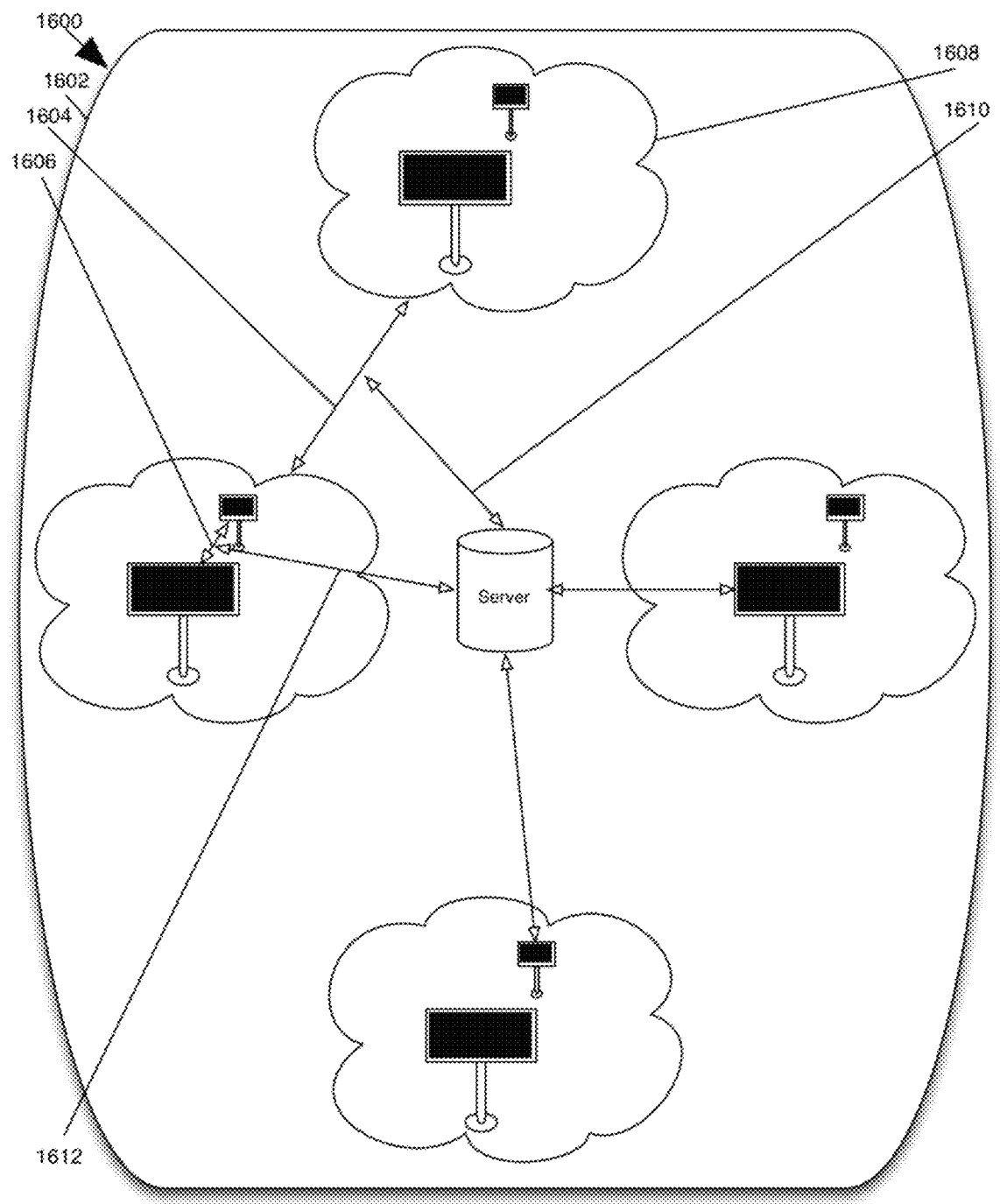
FIG. 16 is a perspective view of the digital display node universe and the various paths of communication with the remote management server of the present invention.
Figure 17:
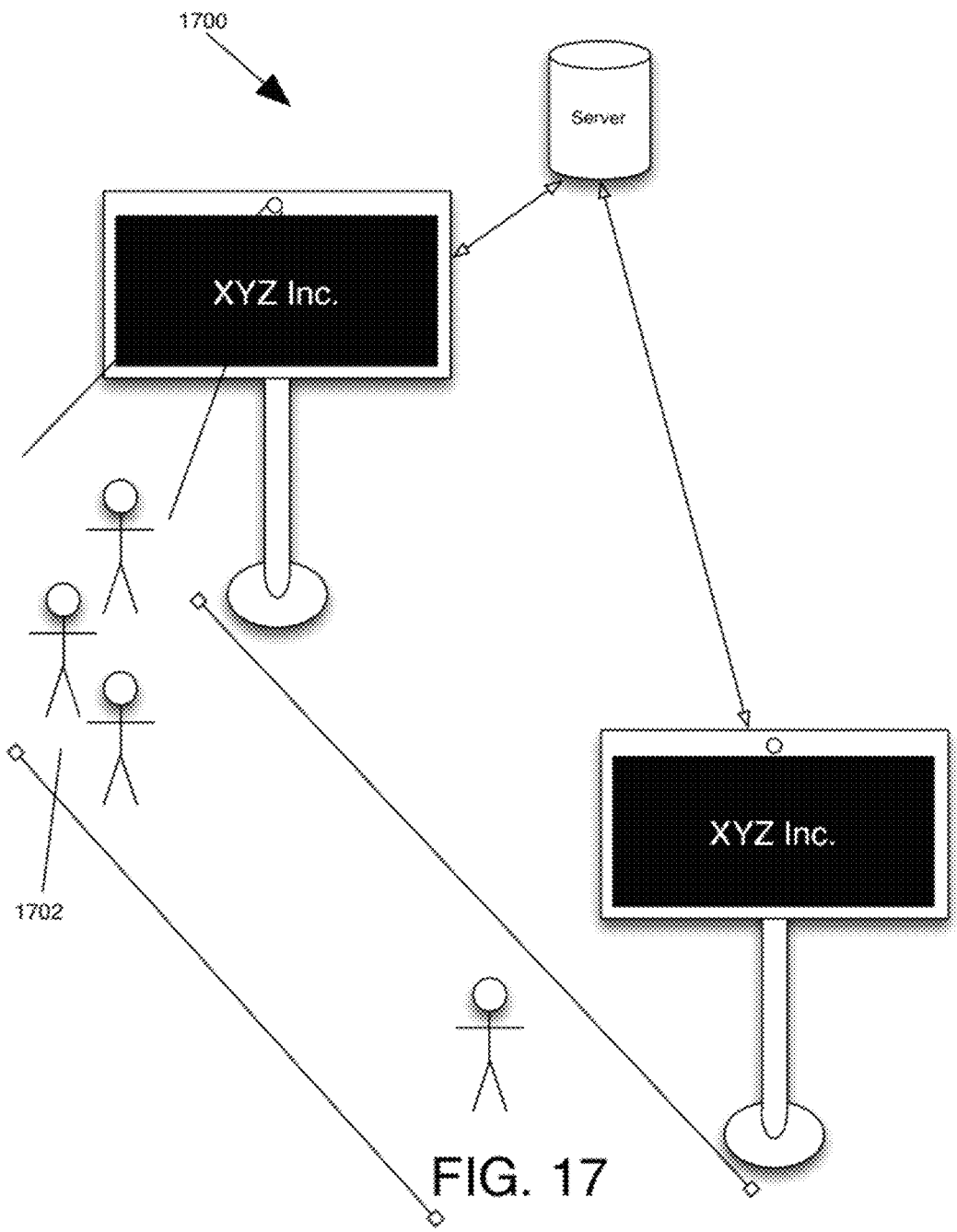
FIG. 17 is a perspective view of the digital display smart node system which illustrates the use of embedded cameras and server communication to intelligently forward digital content to digital display node(s)

In another embodiment and implementation of the present invention, the system of defining a node "universe" 1602 is employed. A digital space estate as previously defined is a block of time on a digital display node 710 that allows for digital content to be published on. Also as noted, digital space estates 316 are dynamically set according to system preferences and can vary in time, cost, location and type of digital space estate(s) 316 throughout all or in some digital display nodes within the digital display node network in any given "galaxy" 1608 of digital display nodes throughout the entire digital display node "universe" 1602. A node "galaxy" 1608 as seen in FIG. 16, is meant to depict a single network of digital display nodes within a certain geographical region. An example would be a shopping mall that contains one or several digital display node(s) 710. Any location in which there is even a single digital display node forms a display network that is known as a node "galaxy" 1608. The accumulation of one or many "galaxies" forms a node "universe" as seen in FIG. 16 where there are several clouds representing "galaxies" contained within the boundaries of the node "universe" 1602. A digital display node 710 must be registered with the remote management server(s) 1304 that control the entire "universe" 1602 of digital display nodes. Communication between the digital display node(s) 710 within a "galaxy" is done via a peer to remote management server 1304 methodology seen in FIG. 16. The referred to remote management server(s) 1304 holds the aforementioned MAC address map scheme as seen in FIG. 7. This mapping scheme serves as the basis of the ability for the remote management server(s) 1304 to communicate with each digital display node 710 in any galaxy across the entire digital display node universe as seen in FIG. 16. Entire networks can communicate as well due to this tracking system. As seen in the "galaxy-to-galaxy" path 1604, this means that digital display node "galaxy" 1608 can communicate with another "galaxy" 1608 via communication with the centralized remote management server(s) as seen indicated by the "galaxy" 1608 communication path to remote management server(s) path 1610. In the node-node within a "galaxy" 1608 communication path 1606, it can be seen that once again via node-to-node "galaxy" 1608 decisions are made via the server-node communication path 1612 between digital display nodes and remote management server(s). What all this allows, is the ability for "galaxies" to intelligently predict the next "galaxy" to which digital content should be pushed based on audience feedback. With the aforementioned digital display node map scheme in mind and with the feedback given to the remote management server from the current digital display node 710 in question, a calculation is done to determine positive audience feedback. The results are then used to push digital content out to the new digital display node(s) 710 either within the same "galaxy" 1608 or to another of the other "galaxy" networks seen in FIG. 16. This is known as smart node prediction as seen in FIG. 17. As an example, in one or more preferred implementations, a determination that viewers of the first digital content viewed the first digital content on average for longer than viewers of a second digital content, causes the second digital content to automatically be replaced, in future time slots the second digital content was scheduled to run, with the first digital content. In more general terms, a system can be configured such that a determination that particular digital content is more successful in holding viewer attention automatically informs a decision as to what digital content to present in future time slots. In one or more preferred implementations, software is configured and used to determine viewer interest in other ways as well. For example, in one embodiment, facial recognition software is configured to identify expressions on viewer faces and determine an interest level.

In yet another embodiment of the present invention, a smart node prediction network and its internal workings are described. In order to intelligently feed new digital display node(s) 710 in a network with digital content to better capture audience attention, the employment of a location based analytics processing system is used on the remote management server(s) 1304. This system is aware of all digital display nodes within all networks in any of the "galaxies" within the digital display node "universe" 1602. In this digital display node ecosystem, there are a few features put into use to gauge the level of positive audience feedback. In one or more preferred implementations, a system is configured to utilize interest feedback to automatically switch from first digital content to second digital content, or to automatically switch digital content on the fly from a first digital display node to another digital display node. The level of perceived interest from employing location-based analytics is used to push relevant digital content onto future digital display nodes along the current path of individuals who have passed previous nodes. All nodes communicate with each other through the centralized remote management server(s) 1304. In conjunction with feedback from various digital display nodes, a determination is made about the most relevant path that digital content should be sent towards. This is a system that uses the score that is calculated by the remote management server(s) 1304 from the digital display node feedback to determine the path that a majority of individuals who have either walked or driven by a previous digital display node 710 are projected to take. Latitude and longitude coordinates are stored for every display in the remote management server(s) 1304 and are used by the digital space estate management company to allow the prediction of best route for the digital content to take. More specifically, in regards to the calculation that the system uses to make projections the concept of an "Interest Pulse" is now discussed. An "Interest Pulse" of users is sent in between other digital display nodes in our advertising network such that all digital display nodes understand what is trending and serve a greater cause of pushing the "optimal" digital content to all displays. "Optimal" in this case can mean either a clone of previous digital content, which has been deemed to gauge the interest of individuals who have passed previous nodes or related content that will likely engage them. An "Interest Pulse" is defined, as machine perceived reaction to digital content that has been viewed by humans. There is a system incorporated into digital display node(s) for the processing and analysis of location-based information such as human interaction with digital display node or the current traffic conditions during specific or all times of day, through the use of an analytics system. The analytics are captured through two major camera analytics algorithms that are proprietary and specifically employed by the digital space estate management company in a proprietary way. One is the use of facial detection, which allows for the tracking of a running headcount for new heads that enter the line of sight of an embedded camera at the digital display node location. Biological identification software, such as, for example, facial recognition software, is utilized to track individuals as they move through an area comprising multiple digital display nodes. The other is the use of that same camera to simply count the number of bodies that it sees in its line of sight for calculating traffic conditions. This can be seen in FIG. 17. It is imperative to note that not every digital display node will have embedded cameras and thus not every digital display node can be considered a part of the smart node network however, whether they have embedded cameras or not, the digital display nodes are always interacting with the remote management server(s) 1304 such that even ones without smart node capability have the capacity to receive digital content from smart node equipped digital display nodes.

The raw analytics data from these camera based tracking algorithms is pushed back to remote management server(s) 1304. Scores are assigned on various test parameters used in analyzing the video. These scores are combined to calculate the aforementioned "Interest Pulse" using a proprietary scale and formula. Scoring is kept for two main test parameters. The first is the number of bodies or transportation devices detected which are recorded on a 1 thru 10 scale. Second is the number of faces perceived to be looking at the digital display node screen, are recorded on a 1 thru 5 scale. The scoring is not limited to these test parameters but can be expanded as necessary. A summation and subsequent division of the aforementioned two scores is done to achieve the "Interest Pulse". Based on a margin of threshold above the average score (the average in this particular test case based on a total of 15 points is rated at 7.5 but can vary based on additional test parameters the digital space estate management system may or may not choose to employ), digital content is either pushed or not pushed to the new digital display node(s) along the perceived path of individuals. Additional digital content may be pushed for a variety of reasons but there are two main ones. The first is to push the same or similar digital content to new digital display nodes to continue engaging the audience in the case where the "Interest Pulse" was well above the average score. The second is to push new digital content in an effort to win back the audience attention that may have been lost due to a low "Interest Pulse" score. In both cases, either existing or new digital content is pushed onto projected future digital display node(s) 710 as seen in FIG. 17. One of the most critical aspects of this smart node system, is that the remote management server(s) 1304 is given full capability to adjust or push the same digital content if needed based on real-time conditions taking place geographically near the digital display node(s) 710 in question to attract the attention of new audience or maintain the attention of past audience that are judged by the system to be following a certain path along the digital display node(s) 710.

Figure 28:
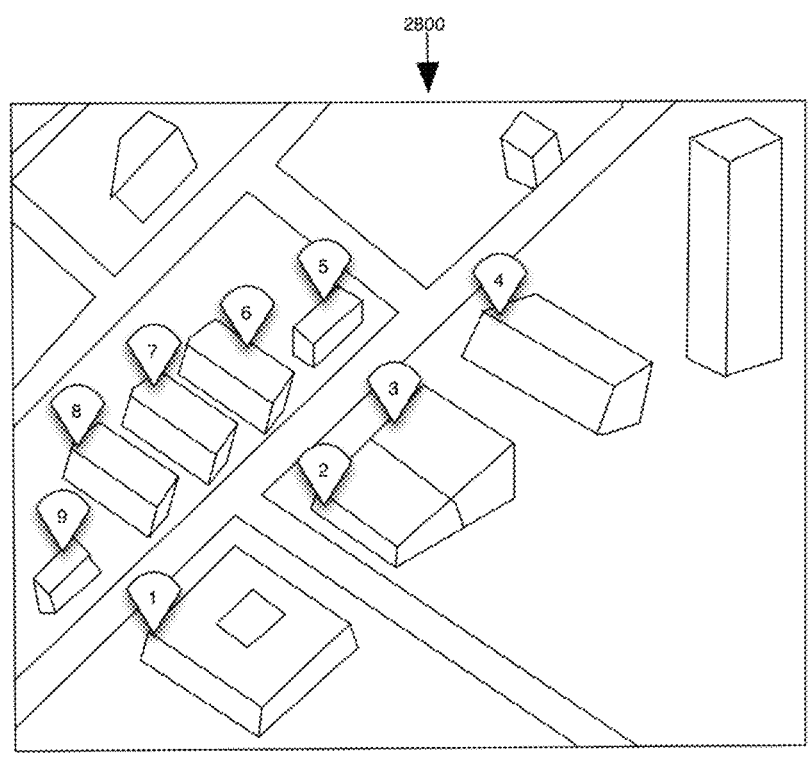
FIG. 28 illustrates many digital display nodes with embedded cameras arranged along a road in a city.
Figure 29:
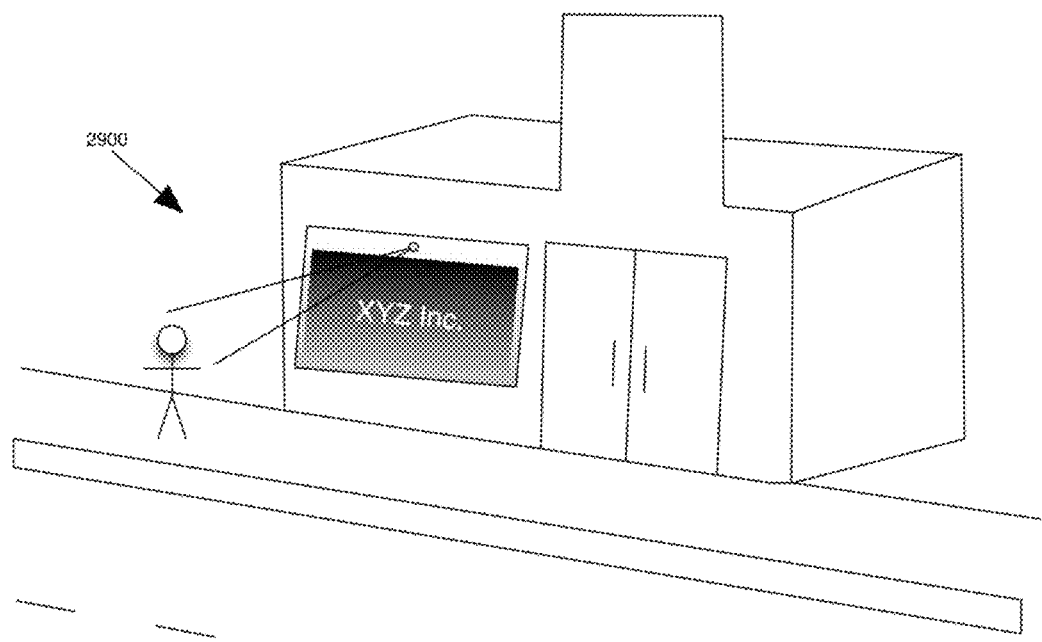
FIG. 29 illustrates capturing of an image of a pedestrian's face at a digital display node.

In another embodiment and implementation of the smart node tracking system, the smart node tracking system can also be use to simply track viewer behavior and modify digital content based on that behavior without necessarily digitally projecting future paths with digital display nodes along that path to continue to engage that user only. For example, FIG. 29 illustrates capturing of an image of a particular pedestrian's face at device 4 as he or she views a particular digital content on the digital display node of device 4. The particular digital content was an advertisement for a hamburger restaurant disposed geographically near device 9 seen in FIG. 28. Images from the other devices disposed along the road can be used to track the pedestrian as he or she moves along the road. For example, if the pedestrian decides to cross the street and visit a hot dog stand geographically close to device 8, rather than the hamburger restaurant disposed close to device 9, the pedestrian's movement may be tracked via device 5, device 3, device 6, device 2, and device 7. In one or more preferred implementations, tracking data is saved for later automated and/or manual analysis, while in one or more preferred implementations automated data is utilized to inform digital content presentation. As an example, in a preferred implementation a first digital content for the hamburger restaurant is displayed at device 4, and a second digital content for the hamburger restaurant is displayed at device 5. Thereafter, tracking software is used to determine what percentage of viewers of each digital content visit the hamburger restaurant soon after they viewed the digital content. A determination is made that more viewers of the first digital content visited the hamburger restaurant than viewers of the second digital content, or a determination that substantially more viewers of the first digital content visited the hamburger restaurant than viewers of the second digital content (e.g. the difference or percentage difference exceeds a minimum rating), causes the second digital content to automatically be replaced, in future time slots the digital content was scheduled to run, with the first digital content.

Figure 18:
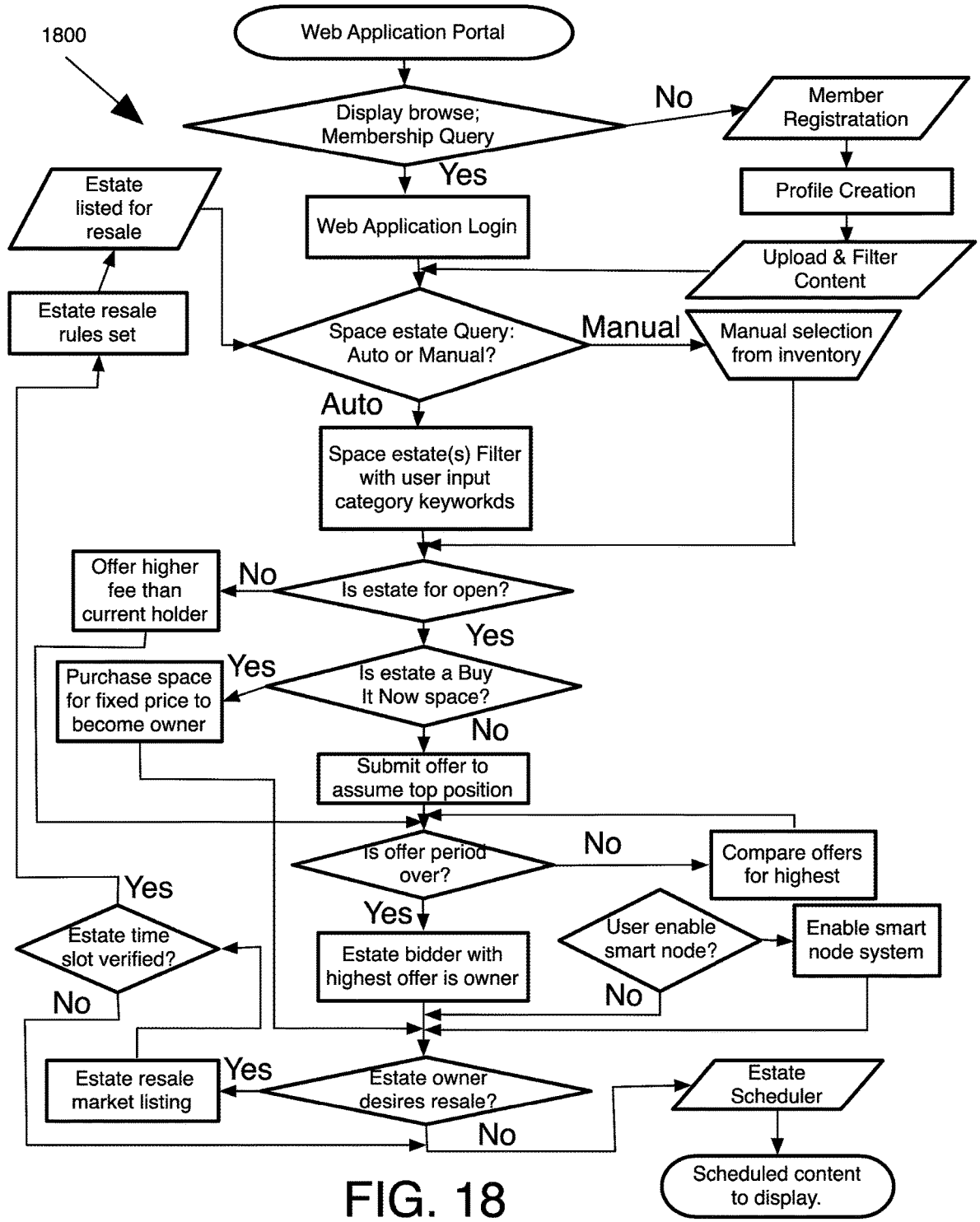
FIG. 18 is an exemplary process flow in accordance with one or more preferred implementations of the present invention.

In another implementation of the present invention, for users of the digital space estate management company's web service portal 1302 interface to actually make use of the smart node system available, they will have the ability to categorize their digital space estate purchase preference such that smart node operation can take place with their purchased digital space estate(s) 316 as seen in FIG. 17. Essentially the user gets the option to define the digital space estate(s) 316 purchase in such a way as to allow the system to have the flexibility to move the digital space estate primary or secondary (alternate) content from one digital display node 710 to the next in the same or any "galaxy" 1608 in the "universe" 1602 of digital display nodes. The user will have the option of purchasing any number of individual digital space estate(s) 316 as previously mentioned or they will have the ability simply tell the digital space estate management system via web service portal 1302 commands that in the event the purchase transaction successfully completes (via either "Auction" 110 based or "Buy It Now" 108 methodologies), the system is to dictate the movement of their digital content, based on the audience feedback from any given digital display node in any "galaxy" 1608 of nodes. For this to work, there must at least be one digital space estate purchased on the initial display and if there is not then the user in question must purchase a minimum of two time slots, where one digital space estate is fixed and the other is dynamic in the sense that the digital content can potentially move to another digital display node 710 and another time slot within any "galaxy" 1608 inside the "universe" 1602 of nodes based on the feedback of the first digital display node(s) 710. To better illustrate how the concept of smart node display communication works, the overall flow chart depicts the process in FIG. 18. Digital display node communication is presented in the flow chart to clarify the various decisions that can be made in a smart node content push operation. FIG. 18 also depicts the entire operational flow of the digital space estate management system.

In yet another embodiment and implementation of the present invention, a simplified system of eliminating any digital space estate timeline grid 314 decisions from the users of the web service portal 1302 interface is described. As previously discussed, in one or more preferred implementations, although users can manually select time slots for a digital display node to present their digital content on, the system preferably further can utilize digital space estate attributes for time slots to automatically determine one or more most preferred digital space estates based on relevance scores calculated utilizing user preferences or input. In one or more preferred implementations, a system is configured to automatically select digital space estates for presentation of user digital content in accordance with user preferences and system determined information. For example, a system is configured to select a plurality of digital space estates in accordance with an optimization strategy (e.g. maximum viewership) that meets a user's budget, and present user digital content in the time slots corresponding to said digital space estates. This simplification of digital space estate timeline grid 314 decisions means that all a user would have to do is upload their desired digital content and let the system dictate where it should go based on user specified criteria. This system is similar to the aforementioned smart node system in that it allows the digital space estate management system to decide when and where to send the digital content uploaded by the user. It would still allow users to purchase digital space estates and the methods for purchase would still be via fixed "Buy It Now" 108 or a variable "Auction" 110 based purchases. However, rather than specifically purchasing a digital space estate, the user would be placing acquisition amount offers on categories where winners of the "Auction" 110 based system would get the digital space estates deemed by the system using a variety of parameters among which is the MDI score methodology aforementioned, to be the most valuable. Runners up to winners would get the next most valuable digital space estates unless a user who has purchased a "Buy It Now" 108 has already made an offer on and purchased that digital space estate. This completely eliminates the need for a user to be actively involved and allows for a more efficient digital space estate management system.

In another implementation of the present invention, a more minor feature of the system is employed in regards to checking the health of the smart node network in each "galaxy" 1608. The remote management server(s) issues a network pulse known as a "heartbeat" inquiry. This "heartbeat" is essentially a check on whether each digital display node in the network responds to the handshaking instruction(s). In other words, it's essentially a feedback loop to the remote management server(s) 1304 to indicate whether a digital display node 710 is capable of receiving incoming and outgoing transmissions. These various communications with the digital display node(s) 710 can be seen in FIG. 16. This will allow the remote management server 1304 to gauge whether each digital display node 710 is ready for digital content deployment and publishing. When the remote management server 1304 pings a specific digital display node it sends and expects to receive back packets of information. Based on the response, an "active" response or an "inactive" in all other cases where the digital display node 710 may be powered off or has a failed Internet connection in addition to a variety of other fail scenarios. The remote management server(s) 1304 keeps track of independent scoring systems for the health of each "galaxy" 1608 of digital display nodes within the node "universe" 1602. This type of "heartbeat" record keeping and recognition of the health of each node network "galaxy" 1608 allows the system to do two things. The first and most important is to assure users of the digital space estate management system that the digital display node(s) 710 they selected to publish their digital content on are available to receive the digital content. The second is to make better decisions about the push of content from the remote management server(s) 1304 to independent nodes along the projected path of the audience in question.

In other embodiments and preferred implementations of the present invention, there are several key features of the web service portal 1302. One of these features is digital space estate content provider matching. This is a methodology for matching a potential buyer of the digital space estate with an open digital space estate(s) 316 on given digital display nodes. Matching is done via a proprietary equation that determines the buyer's previous digital space estate queries, historically higher acquisition rates of digital space estate(s) 316, and estimated traffic conditions at the digital display node 710 location(s). Methodology can simply include previous search queries. A second web service portal 1302 feature is the digital display node 710 search which is a method for shopping for open digital space estates by filtering out digital display node(s) 710 based on a search query for selected business categories (examples: "coffee", "indoor", "outdoor", "mall", etc. . . . ). Another feature is the ability for any user of the web service portal 1302 to see a top-level view of their entire digital space estate history. This comes in the form of a dashboard provided to show the user all activities past and present: watch list, active bids, lost bids, digital space estates won, and potentially various other parameters. Another feature is the concept of a web service portal 1302 business synergy matching system. This is a methodology that is employed to match potential business partners based on already predefined system rules. Various clients putting in acquisition amount offers on "Auction" 110 or "Buy It Now" 108 based digital space estates may be perfect client matches and a system built on data intelligence can detect that. The digital space estate management system, through the use of attribute comparison of the digital space estate bidders, would propose that user (client) "B" may be a complementary match for user (client) "A" based on historical selections of digital display node locations, digital content uploads, profile attribute comparisons and potentially various other parameters. A real world example would be a vodka company being paired up with a cranberry juice company. The system preferably provides text based message functionality, as well as audio and video conferencing functionality allowing users to connect and communicate with one another. This method of business synergy matching would help in turn to provide a business-networking tool, which would essentially amount to a business social network for advertisers. This business synergy matching can also help in business users who acquired time slots that they wish to divide and list on the digital space estate resale market. In such cases, they can choose to sell their time slots to businesses that pair well with theirs. In one or more preferred implementations, the system is configured to intelligently analyze attributes of its users and propose to such users to partner with. This analysis might look for businesses that have synergistic business areas, services, or products, or businesses that are located proximate to one another. For example, in one or more preferred implementations, the system preferably analyzes attributes for a first user (e.g. a user associated with a first retail store located at a first location) and attributes for a second user (e.g. a user associated with a second retail store located at a second location), and based on a match value generated utilizing such attributes, determines that there is a possible synergy between two users. As an example, the system might determine that a kitchen remodeling company and a kitchen appliance company offers services that complement one another. As such, the system would inform one or both users of the potential match.

Another web service portal 1302 feature comes in the form of collection of the aforementioned video based analytics for capable digital display node(s) 710 and the analysis of location-based information on each digital display node 710 for every digital space estate of interest. The information processed by the analytics software is stored on the remote management server(s). All authorized digital content distributors (users of the web service portal 1302) will be able to view this information through a web service portal 1302, which receives and transmits data over any communications network standards that are currently employed. An additional feature that is part of this system will be to incentivize digital display node owners in the form of providing them their own analytics portal, which can be known as instant update (IU). This IU system is a software methodology to control updates to digital space estate management web service portal 1302 users who may be nearby a "galaxy" 1608 of digital display node(s) 710 who would like to receive the latest location-based analytics for the purpose of hosting and advertising instant sales at their respective locations. Essentially this would handle the store's desire to offer a "real-time" instant sale based on the positive data fed back to them via the web service portal 1302 in regards to heavy foot traffic or positive facial response at nearby digital display node(s) 710.

In one or more preferred implementations, digital display nodes are disposed in a mobile environment, such as, for example, in a taxi, on a bus, on a train or subway care, or on an airplane. In one or more preferred implementations, location data associated with such a digital display node (e.g. GPS data) is utilized to inform the selection of digital content for that digital display node. As an example, a subway may have a digital display node internally embedded in the respective chained vehicle units or externally attached on the outside body of each respective chained vehicle unit for the purpose of display of digital content. In one or more preferred implementations, GPS data for the subway is utilized to inform selection of digital content for the digital display node. As the subway travels along a particular railway close to a business location, the system may determine that the subway is located within close range of that business, and further determine that the business is a user of the system and has indicated a preference to have a digital advertisement displayed on the mobile digital display nodes passing through the vicinity if such a digital display node has digital space estates whose cost is less than a certain acquisition amount. Based on such determinations, the system may schedule display of the digital advertisement for the restaurant on the mobile digital display node of the subway.

In one or more preferred implementations, digital content is preloaded at an electronic device comprising the mobile digital display node, while in one or more other preferred implementations, digital content is streamed to an electronic device comprising the mobile digital display node. In one or more preferred implementations, DaCast, Kaltura, or Wowza streaming software is utilized in combination with content hosted at cloud servers, although it will be appreciated that alternative technologies may well be utilized in other preferred implementations.

Although largely described herein in the context of a web service portal 1302, in one or more preferred implementations such a portal can be accessed in ways beyond just a web browser. In one or more preferred implementations, a smart phone application provides an interface to such a web service portal 1302. In one or more preferred implementations, a user may access a portal via a web browser or an application, such as a smart phone application. Furthermore, in one or more preferred implementations, an application, such as a smart phone or tablet application, is configured to provide functionality described herein.

Based on the foregoing description, it will be readily understood by those persons skilled in the art that the present invention is susceptible of broad utility and application. Many embodiments and adaptations of the present invention other than those specifically described herein, as well as many variations, modifications and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptation, variations, modifications or equivalent arrangements, the present invention being limited only by the claims appended hereto and the equivalents thereof.

What is claimed is:

1. A method for setting up, authenticating, identifying digital display nodes, and allowing users to attempt to schedule digital content for publishing on one or more digital display nodes during one or more time slots that includes analyzing time slots as digital space estates, on a system that facilitates the intelligent migration of digital content provided by a user who has acquired at least two digital space estates and secured the right to schedule digital content for publishing on one or more digital display nodes in a smart digital display node network, the method comprising:
  a) storing, at a remote management server for the digital display node network, a unique identifier for each of a plurality of registered digital display nodes forming part of the digital display node network, each unique identifier for a registered digital display node being stored in association with geographical tracking information;
  b) receiving, from a first user of a plurality of users via a presented interface, user input corresponding to a preference to participate in smart node tracking;
  c) storing in a data store, the preference of the first user who has indicated their preference to participate in smart node tracking;
  d) receiving, from the first user, an acquisition offer to purchase at least two digital space estates on the same digital display node or at least two digital space estates in asynchronous nonparallel time slots on separate digital display nodes;
  e) storing, in a data store, data corresponding to the first user's offer to purchase the two or more digital space estates on either the same digital display node or separate digital display nodes in asynchronous nonparallel time slots;
  f) upon expiration of an acquisition offer period for the said digital space estates with offers by the first user on them, automatically determining at the remote management server that the first user who submitted the offers has acquired time slots, and further determining, at the remote management server, that the user had indicated their preference to participate in the smart digital display node tracking system;
  g) effecting display, at a time corresponding to a first time slot out of the two or more time slots that the first user has acquired, of first digital content of the first user on the chosen primary digital display node;
  h) tracking and storing at the remote management server, based on the stored geographical tracking information for the digital display nodes in the digital display network, the location of existing secondary digital display nodes;
  i) recording first video of an area proximate the primary digital display node while the first digital content of the first user is being displayed during the first time slot at the primary digital display node;
  j) automatically determining, using the recorded first video and an object detection algorithm, a number of bodies or transportation devices detected to have been present while the first digital content of the first user was being displayed during the first time slot at the primary digital display node,
  k) automatically determining, using the recorded first video and a facial detection algorithm, a number of faces perceived to have been looking at the primary digital display node while the first digital content of the first user was being displayed during the first time slot at the primary digital display node;
  l) automatically calculating an interest pulse score for the display of the first digital content of the first user during the first time slot using
    i) the determined number of bodies or transportation devices detected to have been present while the first digital content of the first user was being displayed during the first time slot at the primary digital display node, and
    ii) the determined number of faces perceived to have been looking at the primary digital display node while the first digital content of the first user was being displayed during the first time slot at the primary digital display node;
  m) automatically computing, on the remote management server, the predicted path of bodies or transportation devices based on their movement in the recorded video;
  n) determining, based on the calculated interest pulse score for the display of the first digital content of the first user during the first time slot, to adjust digital content for future publication on the remaining future digital space estates that belong to the first user; and
  o) based on the determination to adjust digital content for future publication, determining second digital content of the first user to publish along the computed predicted path of one or more bodies or transportation devices, and upon determination of the second digital content to be used, publishing the second digital content during one or more of the first user's acquired time slots on a digital display node along the computer predicated path of one or more bodies or transportation devices.

2. The method of claim 1, wherein the smart digital display node network is disposed in an exterior location, interior location, retail location, or a transit hub.

3. The method of claim 1, wherein the smart digital display node network is comprised of a network of LED displays.

4. The method of claim 1, wherein this disclosed method is performed using non-transitory computer readable media containing computer executable instructions.

5. The method of claim 1, wherein the unique identifiers stored at the remote management server comprise MAC addresses.

6. A method for setting up, authenticating, identifying digital display nodes, and allowing users to attempt to schedule digital content for publishing on one or more digital display nodes during one or more time slots that includes analyzing time slots as digital space estates, on a system that facilitates the intelligent migration of digital content provided by a user who has acquired at least two digital space estates and secured the right to schedule digital content for publishing on one or more digital display nodes in a smart digital display node network, the method comprising:
  a) storing, at a remote management server for the digital display node network, a unique identifier for each of a plurality of registered digital display nodes forming part of the digital display node network, each unique identifier for a registered digital display node being stored in association with geographical tracking information;
b) receiving, from a first user of a plurality of users via a presented interface, user input corresponding to a preference to participate in smart node tracking;
c) storing in a data store, the preference of the first user who has indicated their preference to participate in smart node tracking;
d) receiving, from the first user, an acquisition offer to purchase at least two digital space estates on the same digital display node or at least two digital space estates in asynchronous nonparallel time slots on separate digital display nodes;
e) storing, in a data store, data corresponding to the first user's offer to purchase the two or more digital space estates on either the same digital display node or separate digital display nodes in asynchronous nonparallel time slots;
f) upon expiration of an acquisition offer period for the said digital space estates with offers by the first user on them, automatically determining at the remote management server that the first user who submitted the offers has acquired time slots, and further determining, at the remote management server, that the user had indicated their preference to participate in the smart digital display node tracking system;
g) effecting display, at a time corresponding to a first time slot out of the two or more time slots that the first user has acquired, of first digital content of the first user on the chosen primary digital display node;
h) tracking and storing at the remote management server, based on the stored geographical tracking information for the digital display nodes in the digital display network, the location of existing secondary digital display nodes;
i) recording first video of an area proximate the primary digital display node while the first digital content of the first user is being displayed during the first time slot at the primary digital display node;
j) automatically determining, using the recorded first video and an object detection algorithm, a number of bodies or transportation devices detected to have been present while the first digital content of the first user was being displayed during the first time slot at the primary digital display node;
k) automatically determining, using the recorded first video and a facial detection algorithm, a number of faces perceived to have been looking at the primary digital display node while the first digital content of the first user was being displayed during the first time slot at the primary digital display node;
l) automatically calculating an interest pulse score for the display of the first digital content of the first user during the first time slot using
  i) the determined number of bodies or transportation devices detected to have been present while the first digital content of the first user was being displayed during the first time slot at the primary digital display node, and
  ii) the determined number of faces perceived to have been looking at the primary digital display node while the first digital content of the first user was being displayed during the first time slot at the primary digital display node;
m) automatically computing, on the remote management server, the predicted path of bodies or transportation devices based on their movement in the recorded video;
n) determining, based on the calculated interest pulse score for the display of the first digital content of the first user during the first time slot, to adjust digital content for future publication on the remaining future digital space estates that belong to the first user; and
o) based on the determination to adjust digital content for future publication, publishing the first digital content during one or more of the first user's acquired time slots on a digital display node along the computed predicted path of one or more bodies or transportation devices.

7. The method of claim 6, wherein the smart digital display node network is disposed in an exterior location, interior location, retail location, or a transit hub.

8. The method of claim 6, wherein the smart digital display node network is comprised of a network of LED displays.

9. The method of claim 6, wherein this disclosed method is performed using non-transitory computer readable media containing computer executable instructions.

10. The method of claim 6, wherein the unique identifiers stored at the remote management server comprise MAC addresses.

* * * * *